(12) United States Patent
Yuzuriha et al.

(10) Patent No.: US 8,249,269 B2
(45) Date of Patent: Aug. 21, 2012

(54) SOUND COLLECTING DEVICE, SOUND COLLECTING METHOD, AND COLLECTING PROGRAM, AND INTEGRATED CIRCUIT

(75) Inventors: Shinichi Yuzuriha, Osaka (JP); Takeo Kanamori, Osaka (JP)

(73) Assignee: Panasonic Corporation, Osaka (JP)

( * ) Notice: Subject to any disclaimer, the term of this patent is extended or adjusted under 35 U.S.C. 154(b) by 288 days.

(21) Appl. No.: 12/746,624

(22) PCT Filed: Dec. 5, 2008

(86) PCT No.: PCT/JP2008/003631
§ 371 (c)(1),
(2), (4) Date: Jun. 7, 2010

(87) PCT Pub. No.: WO2009/075085
PCT Pub. Date: Jun. 18, 2009

(65) Prior Publication Data
US 2010/0266139 A1    Oct. 21, 2010

(30) Foreign Application Priority Data
Dec. 10, 2007    (JP) .................................. 2007-318032

(51) Int. Cl.
*H04B 3/00* (2006.01)
*H04R 3/00* (2006.01)
(52) U.S. Cl. .......................................... 381/80; 381/92
(58) Field of Classification Search .................... 381/80, 381/92, 122, 91, 71.1, 71.11, 98, 101, 56, 381/58, 95; 367/124, 125; 704/225, 226, 704/236–239; 348/14.01, 14.08, 14.12
See application file for complete search history.

(56) References Cited

U.S. PATENT DOCUMENTS
5,208,864 A * 5/1993 Kaneda ......................... 704/258
5,978,490 A    11/1999 Choi et al.
6,130,949 A * 10/2000 Aoki et al. .................... 381/94.3
6,317,501 B1 * 11/2001 Matsuo ........................... 381/92
(Continued)

FOREIGN PATENT DOCUMENTS
JP        9-182044      7/1997
(Continued)

OTHER PUBLICATIONS
International Search Report issued Feb. 24, 2009 in corresponding International Application No. PCT/JP2008/003631.
(Continued)

*Primary Examiner* — Hai Phan
(74) *Attorney, Agent, or Firm* — Wenderoth, Lind & Ponack, L.L.P.

(57) ABSTRACT

The present invention provides a sound collecting device capable of, even when using a freely-movable microphone, generating multichannel signals realizing sound image localization without processing using information about the current position of the microphone. The sound collecting device includes: reference microphones fixedly placed so as to correspond to the respective channels, the reference microphones collecting an arriving sound from the speaker, and outputting reference signals representing signals of the respective channels; at least one actual recording microphone placed so as to be movable, the at least one actual recording microphone collecting the arriving sound from the speaker, and outputting the collected sound as an actual recording signal; and signal generation means for generating signals of the respective channels by performing, based on the reference signals outputted by the reference microphones, predetermined calculation processing for the actual recording signal outputted by the at least one actual recording microphone.

17 Claims, 14 Drawing Sheets

U.S. PATENT DOCUMENTS

| | | |
|---|---|---|
| 2003/0044025 A1* | 3/2003 | Ouyang et al. ............... 381/92 |
| 2004/0141418 A1* | 7/2004 | Matsuo et al. ............... 367/124 |
| 2005/0147261 A1 | 7/2005 | Yeh |
| 2008/0021703 A1* | 1/2008 | Kawamura et al. ........... 704/226 |
| 2009/0248408 A1* | 10/2009 | Ishibashi et al. ............. 704/226 |

FOREIGN PATENT DOCUMENTS

| | | |
|---|---|---|
| JP | 10-153946 | 6/1998 |
| JP | 11-304906 | 11/1999 |
| JP | 11-331827 | 11/1999 |
| JP | 2004-129038 | 4/2004 |
| JP | 2005-184386 | 7/2005 |
| JP | 2007-318550 | 12/2007 |
| WO | 2007/138985 | 12/2007 |

OTHER PUBLICATIONS

Extended European Search Report issued Jun. 13, 2012 in corresponding European Application No. 08 86 0704.

* cited by examiner

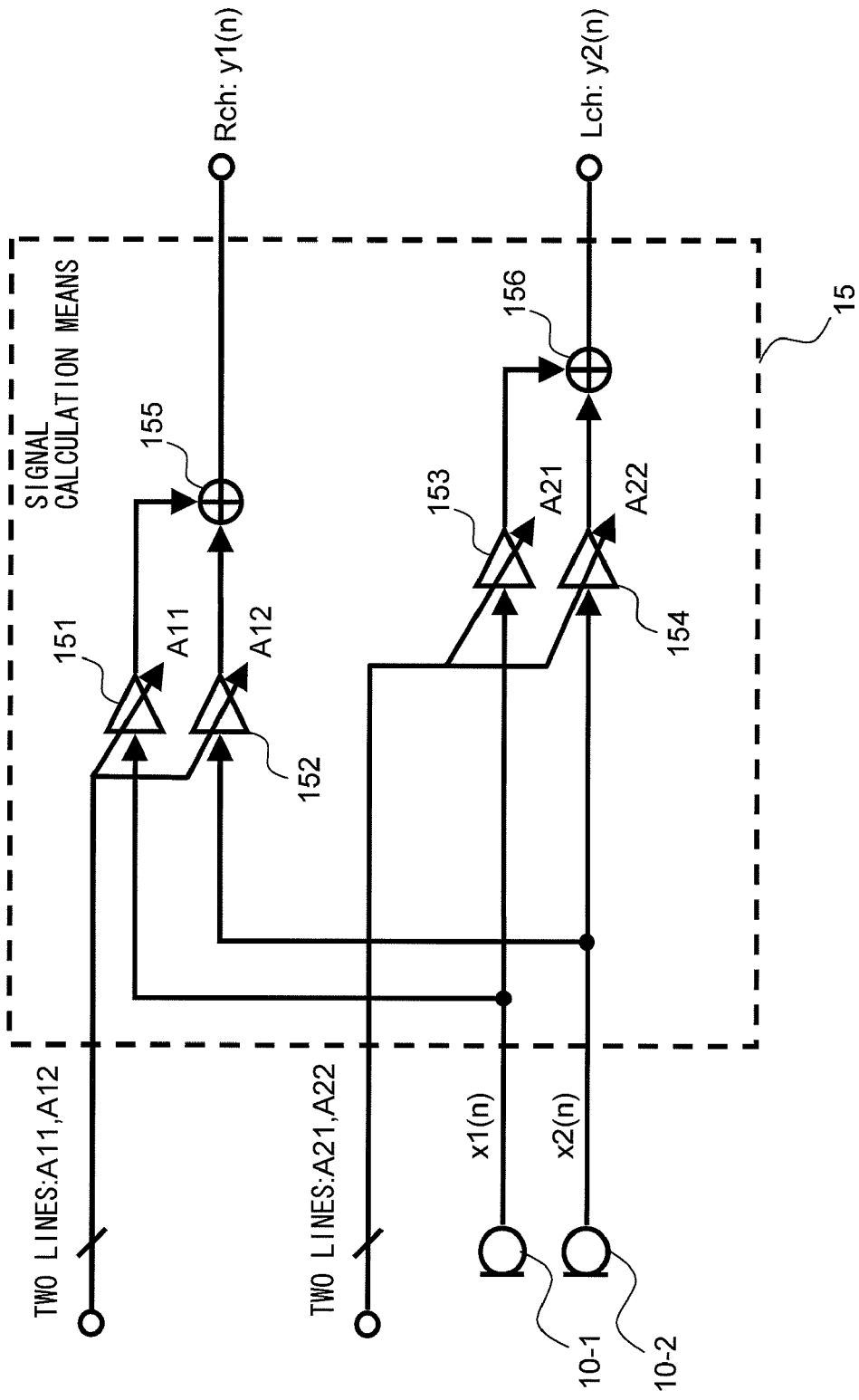
F I G. 5

SOUND COLLECTING DEVICE, SOUND COLLECTING METHOD, AND COLLECTING PROGRAM, AND INTEGRATED CIRCUIT

TECHNICAL FIELD

The present invention relates to a sound collecting device, a sound collecting method, a sound collecting program, and an integrated circuit, and more particularly, to a sound collecting device, a sound collecting method, a sound collecting program, and an integrated circuit which generate multichannel signals by using a plurality of microphones.

BACKGROUND ART

Conventionally, a sound collecting device which generates signals (multichannel signals) corresponding to a plurality of channels by using a plurality of microphones, which signals re-create (realize sound image localization), at a transmission destination, a position of a sound source (for example, a speaker) at a transmission source, is used in an acoustic system such as a television conference system.

The plurality of microphones of the above sound collecting device are provided so as to correspond to the respective channels. In addition, the plurality of microphones are fixedly placed so as to concentrate at one position such that the main axes of the directionalities of the plurality of microphones are directed in the directions corresponding to the respective channels. Thus, the sound collecting device can generate sound collection signals as multichannel signals realizing sound image localization. The generated multichannel signals are transmitted, via a communication network, to a plurality of loudspeakers at a transmission destination. Thus, a multichannel sound is reproduced at the transmission destination, and the position of a speaker at the transmission source is re-created at the transmission destination.

Here, in order to generate multichannel signals realizing sound image localization, the plurality of microphones need to be fixedly placed such that the main axes of the directionalities of the plurality of microphones are directed in the directions corresponding to the respective channels. Therefore, the above sound collecting device does not allow a speaker to freely change the positions at which the plurality of microphones are placed.

Accordingly, a sound collecting device 9 as shown in FIG. 14 and FIG. 15 is supposed in order to solve the above problem (for example, Patent Document 1). FIG. 14 is a diagram showing a part of a configuration of equipment in a television conference system at a transmission source. FIG. 15 is a diagram showing in detail a circuitry configuration in the television conference system at the transmission source. In FIG. 14 and FIG. 15, as an example, an R-channel signal and an L-channel signal are generated as multichannel signals, and then stereo reproduction is realized at the transmission destination.

A microphone 90-1 is provided on a table 3 so as to be positioned in the vicinity of and in front of a speaker 2-1. A microphone 90-2 is provided on the table 3 so as to be positioned in the vicinity of and in front of a speaker 2-2. A monitor 4 is an apparatus for displaying a video image shot by a camera 5a at the transmission destination, and is provided in front of the speakers 2-1 and 2-2. The video image from the transmission destination is inputted to the monitor 4 via a communication network 7. A camera 5 is an apparatus for shooting the speakers 2-1 and 2-2 present at the transmission source, and is provided above the monitor 4. A video image shot at the transmission source is transmitted to a monitor 4a at the transmission destination via a communication network 7. Loudspeakers 6-1 and 6-2 are devices for respectively reproducing the L-channel signal (Lch) and the R-channel signal (Rch) which are inputted via the communication network 7 from a sound collecting device 9a at the transmission destination, and the loudspeakers 6-1 and 6-2 are provided on the both sides of the monitor 4. A loudspeaker 6a-1 at the transmission destination, which is not shown, is provided in front of a speaker at the transmission destination, and to the left as viewed from the speaker. A loudspeaker 6a-2 at the transmission destination, which is not shown, is provided in front of the speaker at the transmission destination, and to the right as viewed from the speaker.

A sound collecting device 9 is provided at the transmission source, and the sound collecting device 9a is provided at the transmission destination. The sound collecting device 9a has the same circuitry configuration as the sound collecting device 9, and the description of the sound collecting device 9a is omitted here. The sound collecting device 9 includes the microphones 90-1 and 90-2, microphone position measurement means 91, coefficient calculation means 92, microphone detection means 93, and signal calculation means 94. Hereinafter, components of the sound collecting device 9 will be described specifically.

The microphone position measurement means 91 outputs a measurement signal to the loudspeakers 6-1 and 6-2. Thereafter, the microphone position measurement means 91 calculates, as a delay time, a time period from when the measurement signal is outputted to when the measurement signal has been collected by the microphones 90-1 and 90-2. The microphone position measurement means 91 measures, from the calculated delay time, the current positions of the microphones 90-1 and 90-2. In FIG. 14, since the microphone 90-1 is placed at a position to the right as viewed from the monitor 4, the position to the right is measured as the current position of the microphone 90-1. In addition, since the microphone 90-2 is placed at a position to the left as viewed from the monitor 4, the position to the left is measured as the current position of the microphone 90-2. Note that, in order that a speaker can freely move the microphones 90-1 and 90-2, the microphone position measurement means 91 measures the current positions of the microphones 90-1 and 90-2 every time the microphones 90-1 and 90-2 are moved.

The coefficient calculation means 92 calculates a ratio (coefficient ratio) of a level to be allocated to the R-channel signal and a level to be allocated to the L-channel signal such that multichannel signals realizing sound image localization are generated based on the measured current positions of the microphones 90-1 and 90-2. In FIG. 14, the measured current position of the microphone 90-1 is a position to the right as viewed from the monitor 4. Therefore, the coefficient calculation means 92 calculates, for example, (R-channel signal: L-channel signal)=(1:0) as a coefficient ratio for the microphone 90-1. On the other hand, the measured current position of the microphone 90-2 is a position to the left as viewed from the monitor 4. Therefore, the coefficient calculation means 92 calculates, for example, (R-channel signal:L-channel signal)=(0:1) as a coefficient ratio for the microphone 90-2.

When either one of the speakers 2-1 and 2-2 speaks, the microphone detection means 93 detects a microphone nearest to the speaking speaker, based on the levels of sound collection signals from the microphones 90-1 and 90-2. For example, when the speaker 2-1 speaks, the level of the sound collection signal from the microphone 90-1 is larger than the level of the sound collection signal from the microphone 90-2. In this case, the microphone detection means 93 detects the microphone 90-1 as a microphone nearest to the speaking speaker. Thereafter, based on the microphone 90-1 detected by the microphone detection means 93, the coefficient calculation means 92 determines, as a coefficient ratio to be outputted to the signal calculation means 94, the coefficient ratio (R-channel signal:L-channel signal)=(1:0) calculated for the microphone 90-1.

The signal calculation means 94 calculates the R-channel signal and the L-channel signal in accordance with the determined coefficient ratio. For example, it is assumed that the coefficient ratio calculated for the microphone 90-1 is (R-channel signal:L-channel signal)=(1:0). In this case, the signal calculation means 94 calculates the R-channel signal by: multiplying each of the sound collection signals of the microphones 90-1 and 90-2 by coefficient "1"; and then summing the sound collection signals. On the other hand, the signal calculation means 94 calculates the L-channel signal by: multiplying each of the sound collection signals of the microphones 90-1 and 90-2 by coefficient "0"; and then summing the sound collection signals. As a result, the R-channel signal is a signal obtained by summing full sound collection signals from the microphones 90-1 and 90-2, and the L-channel signal is at zero level. Thus, the multichannel signals realizing sound image localization are generated. The L-channel signal (Lch) and the R-channel signal (Rch) calculated by the signal calculation means 94 are transmitted, via the communication network 7, respectively to the loudspeakers 6a-1 and 6a-2 at the transmission destination. Thus, reproduction is performed at the transmission destination such that a speaker at the transmission destination hears the speaker 2-1 speaking from a position to the right as viewed from the speaker at the transmission destination.

As described above, every time a microphone is moved, the sound collecting device 9 shown in FIG. 14 and FIG. 15 measures a position (current position) of the moved microphone, and generates multichannel signals realizing sound image localization by using information about the measured current position of the moved microphone. Therefore, the speaker can freely change a position at which the microphone is placed.

Patent Document 1: Japanese Laid-Open Patent Publication No. H9-182044 (FIG. 1, FIG. 2, etc.)

DISCLOSURE OF THE INVENTION

Problems to be Solved by the Invention

However, the sound collecting device 9 shown in FIG. 14 and FIG. 15 has the following problems. (1) Since the sound collecting device 9 performs processing using information about the current position of a microphone, it is necessary to measure the position of the microphone before generating multichannel signals (for example, before starting a conference). (2) Since the sound collecting device 9 performs the processing using information about the current position of a microphone, it is necessary to, every time the position of the microphone is changed by, for example, a speaker moving the microphone during a conference, interrupt the conference to measure again the position of the microphone. (3) Since the speaker can freely move a microphone, the main axis of the directionality of the microphone is not always directed to the speaker. Therefore, in some cases, a microphone detected by the microphone detection means 93 is actually not a microphone nearest to a speaking speaker.

Therefore, an object of the present invention is to provide a sound collecting device which solves the above problems (1) to (3) and is capable of, even when a microphone which can freely be moved is used, generating multichannel signals realizing sound image localization without performing processing using information about the current position of the microphone.

Solution to the Problems

The present invention achieves the above object. A sound collecting device according to the present invention is a sound collecting device used for an acoustic system which outputs signals corresponding to respective channels to a plurality of loudspeakers present at a different place from a place where the sound collecting device is present, via a communication network, the signals including a sound produced by a speaker and collected by using microphones, and which reproduces, by using a plurality of loudspeakers, signals of the respective channels inputted from the different place via the communication network, the sound collecting device comprising: a plurality of reference microphones fixedly placed so as to correspond to the respective channels, the plurality of reference microphones collecting an arriving sound produced by the speaker, and outputting reference signals representing signals of the respective channels; at least one actual recording microphone placed so as to be movable, the at least one actual recording microphone collecting the arriving sound produced by the speaker, and outputting the collected sound as an actual recording signal; and signal generation means for generating signals of the respective channels by performing, based on the reference signals outputted by the plurality of reference microphones, predetermined calculation processing for the actual recording signal outputted by the at least one actual recording microphone, and for outputting the generated signals of the respective channels to the plurality of loudspeakers present at the different place via the communication network.

Note that the above signal generation means, is, for example, means configured by mixing coefficient calculation means (14-1, 14-2) and signal calculation means (15) in an embodiment described later.

In the above sound collecting device according to the present invention, the reference microphones are fixedly placed so as to correspond to the respective channels, and output the reference signals of the respective channels, which realize sound image localization. In addition, the actual recording microphone are placed so as to be movable. Moreover, the signal generation means generates signals (multichannel signals) of the respective channels by performing, based on the reference signals, a predetermined calculation processing for the actual recording signal. Therefore, the sound collecting device according to the present invention is capable of, even when a microphone which can freely be moved is used, generating multichannel signals without performing processing using information about the current position of the microphone, and can solve the above conventional problems (1) to (3).

Alternatively, the sound collecting device may comprise: a plurality of reference microphones fixedly placed so as to correspond to the respective channels, the plurality of reference microphones collecting an arriving sound produced by the speaker, and outputting reference signals representing signals of the respective channels; at least one actual recording microphone placed so as to be movable, the at least one actual recording microphone collecting the arriving sound produced by the speaker, and outputting the collected sound as an actual recording signal; signal generation means for generating signals of the respective channels by performing, based on the reference signals outputted by the plurality of reference microphones, predetermined calculation processing for the actual recording signal outputted by the at least one actual recording microphone; and mixing means for mixing the reference signals outputted by the plurality of reference microphones with the signals of the respective channels generated by the signal generation means, and for outputting the resultant signals to the plurality of loudspeakers present at the different place via the communication network.

Preferably, the at least one actual recording microphone may comprise one actual recording microphone. The signal generation means may include: coefficient calculation means for calculating, for each reference signal, a coefficient by which the actual recording signal outputted by the one actual recording microphone is to be multiplied so that the level of the actual recording signal coincides with each of the levels of the reference signals outputted by the plurality of reference microphones; and signal calculation means for calculating the signals of the respective channels by multiplying the actual recording signal outputted by the one actual recording microphone by each of the coefficients calculated for the respective reference signals by the coefficient calculation means. In this case, the one actual recording microphone may be placed nearer the speaker than the plurality of reference microphones are.

In addition, preferably, the at least one actual recording microphone may comprise a plurality of the actual recording microphones. The signal generation means may include: coefficient calculation means for calculating, for each reference signal, coefficients by which the actual recording signals outputted by the plurality of actual recording microphones are to be multiplied so that the sum of the levels of the actual recording signals coincides with each of the levels of the reference signals outputted by the plurality of reference microphones; and signal calculation means for calculating the signals of the respective channels by multiplying each of the actual recording signals outputted by the plurality of actual recording microphones by each of the coefficients calculated for the respective reference signals by the coefficient calculation means.

In this case, the plurality of actual recording microphone may be placed nearer the speaker than the plurality of reference microphones are. Moreover, the sound collecting device may further comprise determination means for sequentially determining whether or not the largest one of the levels of the reference signals outputted by the plurality of reference microphones is larger than the largest one of the levels of the actual recording signals outputted by the plurality of actual recording microphones. The coefficient calculation means may sequentially calculate the coefficients, and when the determination means determines that the largest one of the levels of the reference signals is larger than the largest one of the levels of the actual recording signals, may stop the calculation of the coefficients, and the signal calculation means may sequentially calculate the signals of the respective channels, and when the coefficient calculation means stops the calculation of the coefficients, may calculate the signals of the respective channels by using coefficients which have been calculated by the coefficient calculation means in the past. Alternatively, the sound collecting device may further comprise determination means for sequentially determining whether or not the sum of the levels of the reference signals outputted by the plurality of reference microphones is larger than the sum of the levels of the actual recording signals outputted by the plurality of actual recording microphones. The coefficient calculation means may sequentially calculate the coefficients, and when the determination means determines that the sum of the levels of the reference signals is larger than the sum of the levels of the actual recording signals, may stop the calculation of the coefficients, and the signal calculation means may sequentially calculate the signals of the respective channels, and when the coefficient calculation means stops the calculation of the coefficients, may calculate the signals of the respective channels by using coefficients which have been calculated by the coefficient calculation means in the past.

Alternatively, the sound collecting device may further comprise determination means for sequentially determining whether or not the speaker is producing a sound, based on the levels of the reference signals outputted by the plurality of reference microphones and on the levels of the actual recording signals outputted by the plurality of actual recording microphones. The coefficient calculation means may sequentially calculate the coefficients, and when the determination means determines that the speaker is not producing a sound, may stop the calculation of the coefficients, and the signal calculation means may sequentially calculate the signals of the respective channels, and when the coefficient calculation means stops the calculation of the coefficients, may calculate the signals of the respective channels by using coefficients which have been calculated by the coefficient calculation means in the past.

Alternatively, the sound collecting device may further comprise determination means for sequentially determining whether or not a speaker present at the different place is producing a sound, based on the levels of signals of the respective channels, sent from the different place. The coefficient calculation means may sequentially calculate the coefficients, and when the determination means determines that the speaker present at the different place is producing a sound, may stop the calculation of the coefficients, and the signal calculation means may sequentially calculate the signals of the respective channels, and when the coefficient calculation means stops the calculation of the coefficients, may calculate the signals of the respective channels by using coefficients which have been calculated by the coefficient calculation means in the past.

Alternatively, the sound collecting device may further comprise: a plurality of first level calculation means provided so as to respectively correspond to the plurality of reference microphones, each of the plurality of first level calculation means sequentially calculating the average of the levels of the reference signals outputted, during a time interval, by the corresponding one of the plurality of reference microphones, the time interval depending on a difference between the largest one of distances from the plurality of reference microphones to the speaker, and the smallest one of distances from the plurality of actual recording microphones to the speaker; and a plurality of second level calculation means provided so as to correspond to the plurality of actual recording microphones, each of the plurality of second level calculation means sequentially calculating the average of the levels of the actual recording signals outputted, during the same time interval as in the plurality of first level calculation means, by the corresponding one of the plurality of actual recording microphones. The coefficient calculation means may sequentially calculate, for each reference signal, coefficients by which the actual recording signals outputted by the plurality of second level calculation means are to be multiplied so that the sum of the levels of the actual recording signals coincides with each of the levels of the reference signals outputted by the plurality of first level calculation means.

Alternatively, the sound collecting device may further comprise: a plurality of first band extraction means provided so as to respectively correspond to the plurality of reference microphones, each of the plurality of first band extraction means extracting and outputting, among reference signals outputted by the corresponding one of the plurality of reference microphones, a reference signal in a frequency band based on a band of a sound produced by the speaker; and a plurality of second band extraction means provided so as to respectively correspond to the plurality of actual recording microphones, each of the plurality of second band extraction means extracting and outputting, among actual recording signals outputted by the corresponding one of the plurality of actual recording microphones, an actual recording signal in the same frequency band as that used by the first band extraction means. The coefficient calculation means may sequentially calculate, for each reference signal, coefficients by which the actual recording signals outputted by the plurality of second band extraction means are to be multiplied so that the sum of the levels of the actual recording signals coincides with each of the levels of the reference signals outputted by the plurality of first band extraction means.

Alternatively, the plurality of reference microphones and the plurality of actual recording microphones may have directionalities. The sound collecting device may further comprise: a plurality of first band extraction means provided so as to respectively correspond to the plurality of reference microphones, each of the plurality of first band extraction means extracting and outputting, among reference signals outputted by the corresponding one of the plurality of reference microphones, a reference signal in a frequency band based on the directionality characteristics of the plurality of reference microphones and the plurality of actual recording microphones; and a plurality of second band extraction means provided so as to respectively correspond to the plurality of actual recording microphones, each of the plurality of second band extraction means extracting and outputting, among actual recording signals outputted by the corresponding one of the plurality of actual recording microphones, an actual recording signal in the same frequency band as that used by the first band extraction means. The coefficient calculation means may sequentially calculate, for each reference signal, coefficients by which the actual recording signals outputted by the plurality of second band extraction means are to be multiplied so that the sum of the levels of the actual recording signals coincides with each of the levels of the reference signals outputted by the plurality of first band extraction means.

Alternatively, the sound collecting device may further comprise: a plurality of first steady suppression means provided so as to respectively correspond to the plurality of reference microphones, each of the plurality of first steady suppression means subtracting a steady noise signal from the reference signal outputted by the corresponding one of the plurality of reference microphones, and outputting the resultant signal; and a plurality of second steady suppression means provided so as to respectively correspond to the plurality of actual recording microphones, each of the plurality of second steady suppression means subtracting a steady noise signal from the actual recording signal outputted by the corresponding one of the plurality of actual recording microphones, and outputting the resultant signal. The coefficient calculation means may sequentially calculate, for each reference signal, coefficients by which the actual recording signals outputted by the plurality of second steady suppression means are to be multiplied so that the sum of the levels of the actual recording signals coincides with each of the levels of the reference signals outputted by the plurality of first steady suppression means.

In addition, preferably, the acoustic system may include a camera for outputting a video image generated by shooting the speaker to a display device present at the different place via the communication network, and the plurality of reference microphones may be fixedly provided to the camera.

In addition, preferably, the plurality of reference microphones may have directionalities, and may be placed such that the main axes of the directionalities are directed in directions corresponding to the respective channels.

In addition, preferably, the plurality of reference microphones may be nondirectional, and may be placed at positions different from each other.

In addition, the present invention is also directed to a sound collecting method. A sound collecting method according to the present invention is a sound collecting method performed in an acoustic system which outputs signals corresponding to respective channels to a plurality of loudspeakers present at a different place from a place where the sound collecting device is present, via a communication network, the signals including a sound produced by a speaker and collected by using microphones, and which reproduces, by using a plurality of loudspeakers, signals of the respective channels inputted from the different place via the communication network, the sound collecting method comprising: a reference step of outputting reference signals by using a plurality of reference microphones fixedly placed so as to correspond to the respective channels, the plurality of reference microphones collecting an arriving sound produced by the speaker, and outputting the reference signals representing signals of the respective channels; an actual recording step of outputting an actual recording signal by using at least one actual recording microphone placed so as to be movable, the at least one actual recording microphone collecting the arriving sound produced by the speaker, and outputting the collected sound as the actual recording signal: a signal generation step of generating signals of the respective channels by performing, based on the reference signals outputted in the reference step, predetermined calculation processing for the actual recording signal outputted in the actual recording step; and an output step of outputting the signals of the respective channels, which have been generated in the signal generation step, to the plurality of loudspeakers present at the different place via the communication network.

In addition, the present invention is also directed to a sound collecting program. A sound collecting program according to the present invention is a sound collecting program to be executed by a computer used in an acoustic system which outputs signals corresponding to respective channels to a plurality of loudspeakers present at a different place from a place where the sound collecting device is present, via a communication network, the signals including a sound produced by a speaker and collected by using microphones, and which reproduces, by using a plurality of loudspeakers, signals of the respective channels inputted from the different place via the communication network, the sound collecting program causing the computer to execute: a reference step of outputting reference signals by using a plurality of reference microphones fixedly placed so as to correspond to the respective channels, the plurality of reference microphones collecting an arriving sound produced by the speaker, and outputting the reference signals representing signals of the respective channels; an actual recording step of outputting an actual recording signal by using at least one actual recording microphone placed so as to be movable, the at least one actual recording microphone collecting the arriving sound produced by the speaker, and outputting the collected sound as the actual recording signal; a signal generation step of generating signals of the respective channels by performing, based on the reference signals outputted in the reference step, predetermined calculation processing for the actual recording signal outputted in the actual recording step; and an output step of outputting the signals of the respective channels, which have been generated in the signal generation step, to the plurality of loudspeakers present at the different place via the communication network.

In addition, the present invention is also directed to an integrated circuit. An integrated circuit according to the present invention is an integrated circuit used for an acoustic system which outputs signals corresponding to respective channels to a plurality of loudspeakers present at a different place from a place where the sound collecting device is present, via a communication network, the signals including a sound produced by a speaker and collected by using microphones, and which reproduces, by using a plurality of loudspeakers, signals of the respective channels inputted from the different place via the communication network, the acoustic system comprising: a plurality of reference microphones fixedly placed so as to correspond to the respective channels, the plurality of reference microphones collecting an arriving sound produced by the speaker, and outputting reference signals representing signals of the respective channels; and at least one actual recording microphone placed so as to be movable, the at least one actual recording microphone collecting the arriving sound produced by the speaker, and outputting the collected sound as an actual recording signal, and the integrated circuit comprising signal generation means for generating signals of the respective channels by performing, based on the reference signals outputted by the plurality of reference microphones, predetermined calculation processing for the actual recording signal outputted by the at least one actual recording microphone, and for outputting the generated signals of the respective channels to the plurality of loudspeakers present at the different place via the communication network.

Effect of the Invention

The present invention makes it possible to provide a sound collecting device capable of, while allowing the position at which a microphone is placed to freely be changed without performing processing using the current position of the microphone, generating multichannel signals realizing sound image localization.

BRIEF DESCRIPTION OF THE DRAWINGS

FIG. 5 is a diagram specifically showing a configuration of the signal calculation means 15.

Figure 1:
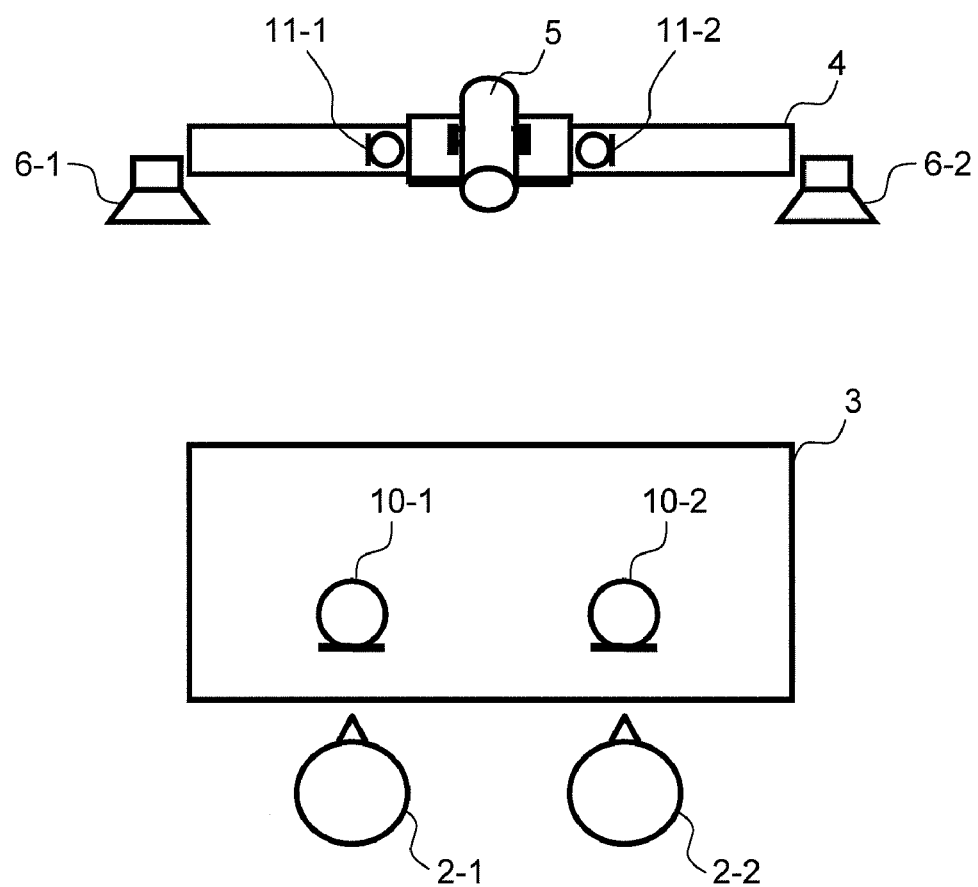
FIG. 1 is a diagram showing a part of a configuration of equipment in a television conference system at a transmission source, in which the sound collecting device 1 according to the first embodiment is used.

DESCRIPTION OF THE REFERENCE CHARACTERS 1, 1a to 1g, 9, 9a sound collecting device
2-1, 2-2 speaker
3 table
4, 4a monitor
5, 5a camera
6-1, 6-2, 6a-1, 6b-1, 6b-2 loudspeaker
7 communication network
10-1, 10-2 actual recording microphone
11-1, 11a-1, 11-2, 11a-2 reference microphone
12-1, 12-2 level calculation means
13-1, 13-2 reference level calculation means
14-1, 14-2 mixing coefficient calculation means
15 signal calculation means
16 mixing means
151 to 154 variable gain device
155, 156 adder
20-1, 20-2 band extraction means
21-1, 21-2 reference band extraction means
30, 40, 50 determination means
60-1, 60-2 steady signal suppression means
61-1, 61-2 reference steady signal suppression means
90-1, 90-2 microphone
91 microphone position measurement means
92 coefficient calculation means
93 microphone detection means
94 signal calculation means

BEST MODE FOR CARRYING OUT THE INVENTION

Hereinafter, embodiments of the present invention will be described referring to the drawings.

First Embodiment

Figure 2:
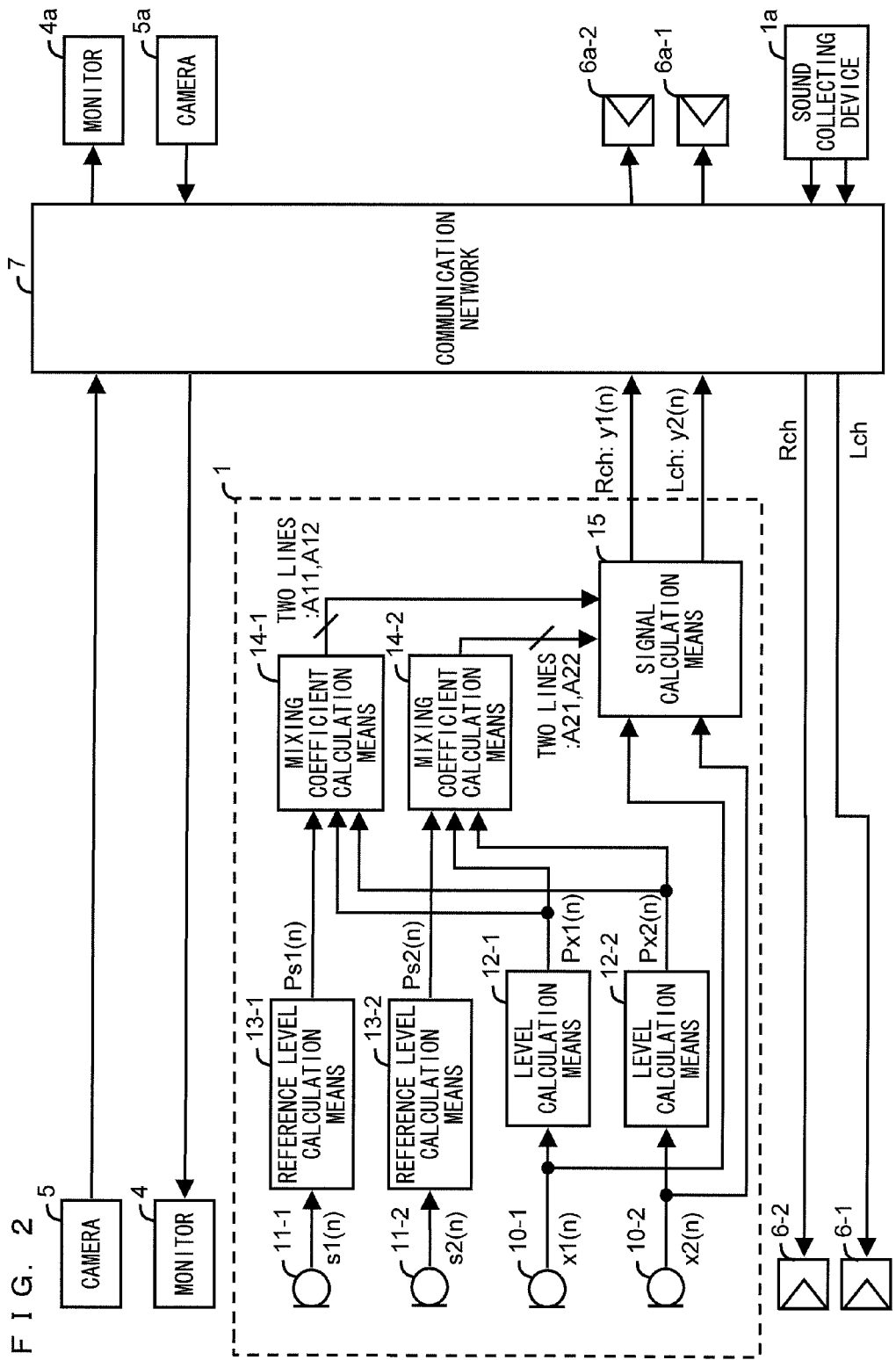
FIG. 2 is a diagram showing in detail a circuitry configuration in the television conference system at the transmission source, in which the sound collecting device 1 according to the first embodiment is used.

Referring to FIG. 1 and FIG. 2, a sound collecting device according to a first embodiment of the present invention will be described. FIG. 1 is a diagram showing a part of a configuration of equipment in a television conference system at a transmission source, in which the sound collecting device 1 according to the first embodiment is used. FIG. 2 is a diagram showing in detail a circuitry configuration in the television conference system at the transmission source, in which the sound collecting device 1 according to the first embodiment is used. In FIG. 1 and FIG. 2, as an example, an R-channel signal and an L-channel signal are generated as multichannel signals, and then stereo reproduction is realized at the transmission destination.

Referring to FIG. 1, a monitor 4 is a device for displaying a video image shot by a camera 5a present at the transmission destination, and is provided in front of speakers 2-1 and 2-2. The video image from the transmission destination is inputted to the monitor 4 via a communication network 7. A camera 5 is a device for shooting the speakers 2-1 and 2-2 at the transmission source, and is provided above the monitor 4. A video image shot at the transmission source is transmitted to a monitor 4a present at the transmission destination via a communication network 7. A loudspeaker 6-1 is placed to the right (to the left as viewed from the speakers 2-1 and 2-2) as viewed from the monitor 4. The loudspeaker 6-1 reproduces the L-channel signal (Lch) inputted via the communication network 7 from a sound collecting device 1a present at the transmission destination. A loudspeaker 6-2 is placed to the left (to the right as viewed from the speakers 2-1 and 2-2) as viewed from the monitor 4. The loudspeaker 6-2 reproduces the R-channel signal (Rch) inputted via the communication network 7 from the sound collecting device 1a present at the transmission destination. A loudspeaker 6a-1, which is not shown, is placed to the right (to the left as viewed from a speaker at the transmission destination) as viewed from the monitor 4a. The loudspeaker 6a-1 reproduces the L-channel signal (Lch) inputted via the communication network 7 from the sound collecting device 1 present at the transmission source. A loudspeaker 6a-2, which is not shown, is placed to the left (to the right as viewed from a speaker at the transmission destination) as viewed from the monitor 4a. The loudspeaker 6a-2 reproduces the R-channel signal (Rch) inputted via the communication network 7 from the sound collecting device 1 present at the transmission source.

A sound collecting device 1 is provided at the transmission source, and the sound collecting device 1a is provided at the transmission destination. The sound collecting device 1a has the same circuitry configuration as the sound collecting device 1, and the description of the sound collecting device 1a is omitted here. The sound collecting device 1 includes actual recording microphones 10-1 and 10-2, reference microphones 11-1 and 11-2, level calculation means 12-1 and 12-2, reference level calculation means 13-1 and 13-2, mixing coefficient calculation means 14-1 and 14-2, and signal calculation means 15. Hereinafter, a configuration of the sound collecting device 1 will be described in detail.

The actual recording microphone 10-1 is provided on a table 3 so as to be positioned in the vicinity of and in front of the speaker 2-1. The actual recording microphone 10-2 is provided on the table 3 so as to be positioned in the vicinity of and in front of the speaker 2-2. The speakers 2-1 and 2-2 can freely change the positions at which the actual recording microphones 10-1 and 10-2 are placed. The actual recording microphone 10-1 collects an arriving sound, and outputs, to the level calculation means 12-1, the collected sound as an actual recording signal $x1(n)$. The actual recording microphone 10-2 collects an arriving sound, and outputs, to the level calculation means 12-2, the collected sound as an actual recording signal $x2(n)$. Note that n indicates the number of a time sample.

Figure 3:
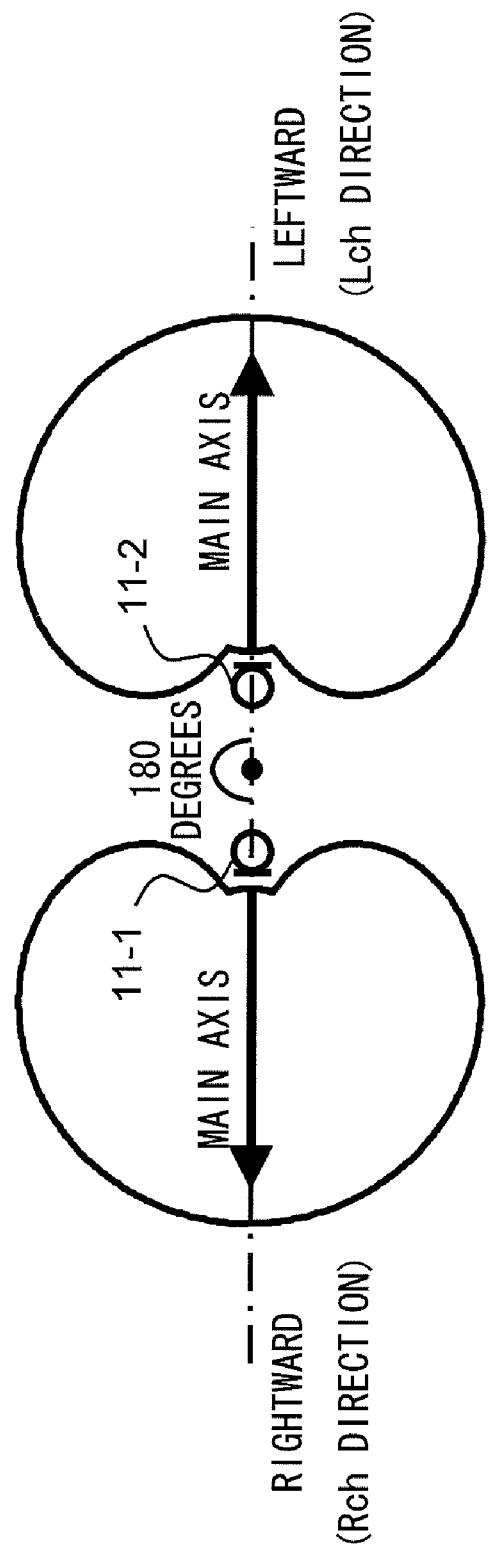
FIG. 3 is a diagram showing a polar pattern in which the angle between the main axes of the directionalities of the reference microphones 11-1 and 11-2 is 180 degrees.

The reference microphone 11-1 is fixedly placed above the monitor 4 so as to correspond to the R-channel. The reference microphone 11-1 collects an arriving sound, and thereby outputs, to the reference level calculation means 13-1, a reference signal $s1(n)$ representing the R-channel signal. Similarly, the reference microphone 11-2 is fixedly placed above the monitor 4 so as to correspond to the L-channel. The reference microphone 11-2 collects an arriving sound, and thereby outputs, to the reference level calculation means 13-2, a reference signal $s2(n)$ representing the L-channel signal. The reference microphones 11-1 and 11-2 are configured by microphones having unidirectionalities, for example. In this case, the reference microphones 11-1 and 11-2 are fixedly placed above the monitor 4 such that the main axes of the directionalities of the reference microphones 11-1 and 11-2 are directed in the directions corresponding to the respective channels. More specifically, as shown in FIG. 3, the main axis of the directionality of the reference microphone 11-1 is directed rightward (in an Rch-direction) as viewed from the monitor 4. The main axis of the directionality of the reference microphone 11-2 is directed leftward (in an Lch-direction) as viewed from the monitor 4, the angle between the main axes of the directionalities of the reference microphones 11-1 and 11-2 being 180 degrees. FIG. 3 is a diagram showing a polar pattern in which the angle between the main axes of the directionalities of the reference microphones 11-1 and 11-2 is 180 degrees. As is found from FIG. 3, the reference microphone 11-1 collects a sound arriving from the Rch-direction at a larger level than a sound arriving from the Lch-direction. On the other hand, the reference microphone 11-2 collects a sound arriving from the Lch-direction at a larger level than a sound arriving from the Rch-direction. Therefore, when, for example, a sound arrives from the position of the speaker 2-1 shown in FIG. 1, the level at which the reference microphone 11-1 collects the sound is larger than the level at which the reference microphone 11-2 collects the sound. As described above, the reference microphones 11-1 and 11-2 are fixedly placed so as to correspond to the respective channels, and output reference signals representing signals of the respective channels. That is, the reference microphones 11-1 and 11-2 separately collect a sound as the R-channel signal and a sound as the L-channel signal.

The actual recording signal $x1(n)$ is inputted to the level calculation means 12-1, and the level calculation means 12-1 calculates an actual recording signal power $Px1(n)$ which is the power level of the actual recording signal $x1(n)$. The level calculation means 12-1 outputs the calculated actual recording signal power $Px1(n)$ to each of the mixing coefficient calculation means 14-1 and 14-2. The actual recording signal $x2(n)$ is inputted to the level calculation means 12-2, and the level calculation means 12-2 calculates an actual recording signal power $Px2(n)$ which is the power level of the actual recording signal $x2(n)$. The level calculation means 12-2 outputs the calculated actual recording signal power $Px2(n)$ to each of the mixing coefficient calculation means 14-1 and 14-2.

The reference signal $s1(n)$ is inputted to the reference level calculation means 13-1, and the reference level calculation means 13-1 calculates a reference signal power $Ps1(n)$ which is the power level of the reference signal $s1(n)$. The reference level calculation means 13-1 outputs the calculated reference signal power $Ps1(n)$ to the mixing coefficient calculation means 14-1. The reference signal $s2(n)$ is inputted to the reference level calculation means 13-2, and the reference level calculation means 13-2 calculates a reference signal power $Ps2(n)$ which is the power level of the reference signal $s2(n)$. The reference level calculation means 13-2 outputs the calculated reference signal power $Ps2(n)$ to the mixing coefficient calculation means 14-2. Hereinafter, unless otherwise specified, each of the level calculation means 12-1 and 12-2 and the reference level calculation means 13-1 and 13-2 calculates a time-average power, and a time interval in which the levels of signals of collected sounds are averaged is a short time interval, the time interval being set for each of the level calculation means 12-1 and 12-2 and the reference level calculation means 13-1 and 13-2.

The reference signal power Ps1($n$), and the actual recording signal powers Px1($n$) and Px2($n$) are inputted to the mixing coefficient calculation means 14-1. The mixing coefficient calculation means 14-1 calculates mixing coefficients (A11, A12) for the actual recording signal powers Px1($n$) and Px2($n$) such that the reference signal power Ps1($n$) is re-created in a simulated manner by using the actual recording signal powers Px1($n$) and Px2($n$). The mixing coefficient calculation means 14-1 outputs the calculated mixing coefficients to the signal calculation means 15. The reference signal power Ps2($n$), and the actual recording signal powers Px1($n$) and Px2($n$) are inputted to the mixing coefficient calculation means 14-2. The mixing coefficient calculation means 14-2 calculates mixing coefficients (A21, A22) for the actual recording signal powers Px1($n$) and Px2($n$) such that the reference signal power Ps2($n$) is re-created in a simulated manner by using the actual recording signal powers Px1($n$) and Px2($n$). The mixing coefficient calculation means 14-2 outputs the calculated mixing coefficients to the signal calculation means 15.

The mixing coefficients (A11, A12, A21, A22) and the actual recording signals x1($n$) and x2($n$) are inputted to the signal calculation means 15. The signal calculation means 15 calculates an output signal y1($n$) which is the R-channel signal (Rch), and an output signal y2($n$) which is the L-channel signal (Lch), in accordance with an expression (1). The signal calculation means 15 transmits the calculated output signals y1($n$) and y2($n$), via the communication network 7, to the loudspeaker 6a-2 present at the output destination and the loudspeaker 6a-1 present at the transmission destination, respectively.

[Number 1]

$$\begin{bmatrix} y1(n) \\ y2(n) \end{bmatrix} = \begin{bmatrix} A11 & A12 \\ A21 & A22 \end{bmatrix} \begin{bmatrix} x1(n) \\ x2(n) \end{bmatrix} \quad (1)$$

Figure 4:
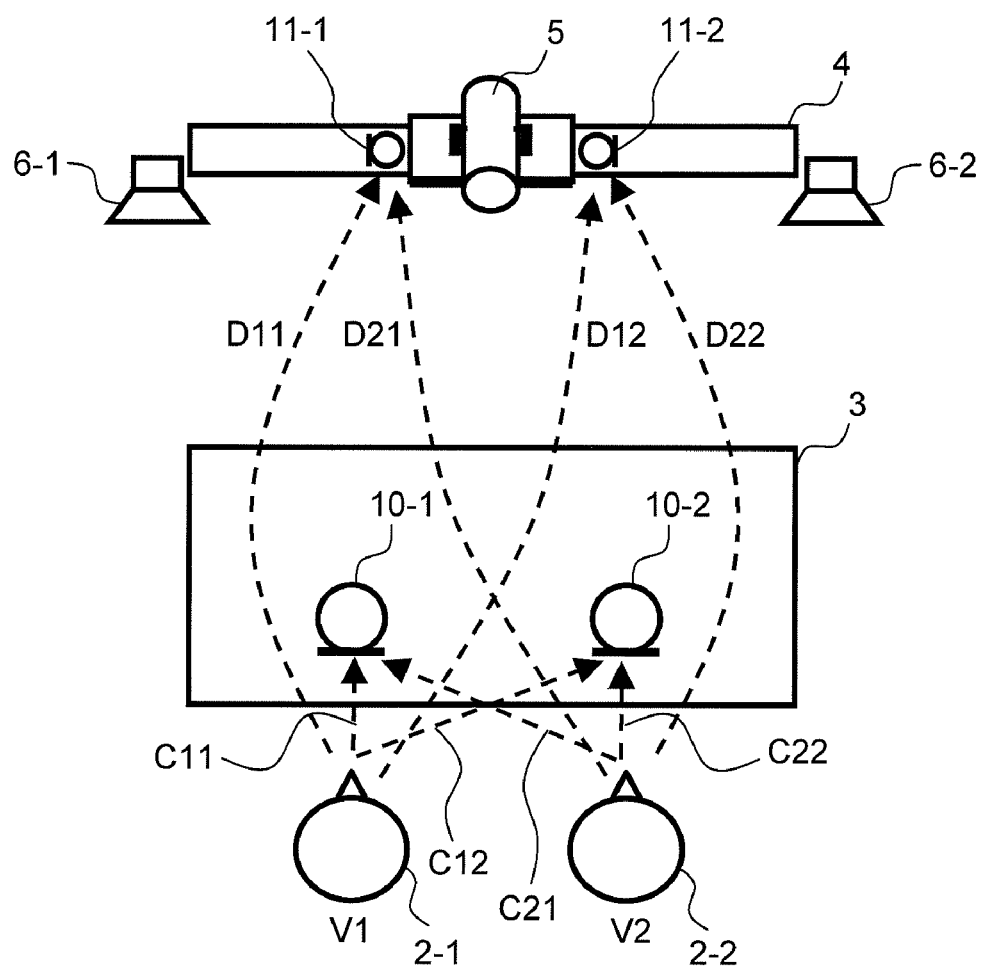
FIG. 4 is a diagram schematically showing transmission paths of sounds produced by the speakers 2-1 and 2-2.

Next, a concept of the present invention will be described. The reference microphones 11-1 and 11-2 can separately collect a sound as the R-channel signal and a sound as the L-channel signal. However, the reference microphones 11-1 and 11-2 needs to be fixedly placed such that the main axes of the directionalities of the reference microphones 11-1 and 11-2 are directed in the directions corresponding to the respective channels. Therefore, the speakers 2-1 and 2-2 cannot freely change the positions at which the reference microphones 11-1 and 11-2 are placed. On the other hand, the positions at which the actual recording microphones 10-1 and 10-2 are placed can freely be changed by the speakers 2-1 and 2-2. However, because the positions at which the actual recording microphones 10-1 and 10-2 are placed can freely be changed, the actual recording microphones 10-1 and 10-2 cannot separately collect a sound as the R-channel signal and a sound as the L-channel signal. Accordingly, in order that, even when a microphone which can freely be moved is used, multichannel signals realizing sound image localization can be generated without performing processing using information about the current position of the microphone, the present invention re-creates, in a simulated manner, by using actual recording signals based on sounds collected by the actual recording microphones 10-1 and 10-2 which can freely be moved, reference signals realizing sound image localization, which are based on sounds collected by the reference microphones 11-1 and 11-2. Hereinafter, a method of the re-creation will be described in detail, referring to FIG. 4. FIG. 4 is a diagram schematically showing transmission paths of sounds produced by the speakers 2-1 and 2-2.

Referring to FIG. 4, V1($n$) and V2($n$) are sound signals based on sounds produced by the speakers 2-1 and 2-2, respectively. The sound signal V1($n$) from the speaker 2-1 passes through an acoustic space while being attenuated, and arrives at the reference microphones 11-1 and 11-2. At this time, an attenuation coefficient on a path from the speaker 2-1 to the reference microphone 11-1 is denoted by D11, and an attenuation coefficient on a path from the speaker 2-1 to the reference microphone 11-2 is denoted by D12. The sound signal V2($n$) from the speaker 2-2 passes through the acoustic space while being attenuated, and arrives at the reference microphones 11-1 and 11-2. At this time, an attenuation coefficient on a path from the speaker 2-2 to the reference microphone 11-1 is denoted by D21, and an attenuation coefficient on a path from the speaker 2-2 to the reference microphone 11-2 is denoted by D22. In addition, the sound signal V1($n$) from the speaker 2-1 passes through the acoustic space while being attenuated, and arrives at the actual recording microphones 10-1 and 10-2. At this time, an attenuation coefficient on a path from the speaker 2-1 to the actual recording microphone 10-1 is denoted by C11, and an attenuation coefficient on a path from the speaker 2-1 to the actual recording microphone 10-2 is denoted by C12. The sound signal V2($n$) from the speaker 2-2 passes through the acoustic space while being attenuated, and arrives at the actual recording microphones 10-1 and 10-2. At this time, an attenuation coefficient on a path from the speaker 2-2 to the actual recording microphone 10-1 is denoted by C21, and an attenuation coefficient on a path from the speaker 2-2 to the actual recording microphone 10-2 is denoted by C22. Note that a short-time average power of the sound signal V1($n$) from the speaker 2-1 is denoted by PV1($n$), and a short-time average power of the sound signal V2($n$) from the speaker 2-2 is denoted by PV2($n$).

Here, the sound signal V1($n$) from the speaker 2-1 and the sound signal V2($n$) from the speaker 2-2 are not correlated with each other. Accordingly, it is considered that a short-time average power of a mixing signal obtained by mixing the sound signals V1($n$) and V2($n$) is equal to the sum of the short-time average power PV1($n$) of the sound signal V1($n$) and the short-time average power PV2($n$) of the sound signal V2($n$). Therefore, the reference signal powers Ps1($n$) and Ps2($n$) of the reference microphones 11-1 and 11-2 are represented by an expression (2). Note that there is no noise except sounds from speakers 2-1 and 2-2.

[Number 2]

$$Ps1(n)=D11 \cdot PV1(n)+D12 \cdot PV2(n)$$

$$Ps2(n)=D21 \cdot PV1(n)+D22 \cdot PV2(n) \quad (2)$$

Similarly, the actual recording signal powers Px1($n$) and Px2($n$) of the actual recording microphones 10-1 and 10-2 are represented by an expression (3).

[Number 3]

$$Px1(n)=C11 \cdot PV1(n)+C12 \cdot PV2(n)$$

$$Px2(n)=C21 \cdot PV1(n)+C22 \cdot PV2(n) \quad (3)$$

By eliminating PV1($n$) and PV2($n$) from the expressions (2) and (3), an expression (4) is obtained.

[Number 4]

$$Ps1(n)=B11 \cdot Px1(n)+B12 \cdot Px2(n)$$

$$Ps2(n)=B21 \cdot Px1(n)+B22 \cdot Px2(n) \quad (4)$$

Moreover, B11, B12, B21, and B22 are obtained from an expression (5) using matrices.

[Number 5]
$$\begin{bmatrix} B11 & B12 \\ B21 & B22 \end{bmatrix} = \begin{bmatrix} D11 & D12 \\ D21 & D22 \end{bmatrix} \begin{bmatrix} C11 & C12 \\ C21 & C22 \end{bmatrix}^{-1} \quad (5)$$

The above expression (4) indicates that the reference signal power Ps1(n) corresponding to the R-channel signal can be replaced by a linear combination of the actual recording signal power Px1(n) multiplied by a coefficient B11 and the actual recording signal power Px2(n) multiplied by a coefficient B12. In addition, the above expression (4) indicates that the reference signal power Ps2(n) corresponding to the L-channel signal can be replaced by a linear combination of the actual recording signal power Px1(n) multiplied by a coefficient B21 and the actual recording signal power Px2(n) multiplied by a coefficient B22. Therefore, by using the coefficients B11, B12, B21, and B22 as the coefficients A11, A12, A21, and A22 in the above expression (1), reference signals realizing sound image localization, which are from the reference microphones 11-1 and 11-2, can be re-created in a simulated manner by using actual recording signals from the actual recording microphones 10-1 and 10-2 which can freely be moved. As a result, even when an actual recording microphone which can freely be moved is used, the R-channel signal and the L-channel signal which realize sound image localization can be generated without performing processing using information about the current position of the actual recording microphone.

Next, processing performed by the mixing coefficient calculation means 14-1 and 14-2, and processing performed by the signal calculation means 15, which are performed for realizing the above-described concept of the present invention, will be specifically described.

The mixing coefficient calculation means 14-1 calculates the coefficients B11 and B12 satisfying the above expression (4), by using the inputted reference signal power Ps1(n) and the inputted actual recording signal powers Px1(n) and Px2(n). Here, from the above expression (4), the reference signal power Ps1(n) is represented by a linear combination of the actual recording signal power Px1(n) multiplied by the coefficient B11 and the actual recording signal power Px2(n) multiplied by the coefficient B12. Therefore, by using adaptive equalization algorithm, while the reference signal power Ps1(n) (n= . . . n−1, n, n+1, . . . ) and the actual recording signal powers Px1(n) and Px2(n) are inputted to the mixing coefficient calculation means 14-1 in chronological order, the mixing coefficient calculation means 14-1 can calculate the coefficients B11 and B12 such that the sum of the power levels of the actual recording signal powers Px1(n) and Px2(n) respectively multiplied by the coefficients B11 and B12 is equal to the power level of the reference signal power Ps1(n). The mixing coefficient calculation means 14-1 outputs, to the signal calculation means 15, the calculated B11 as A11 in the above expression (1), and the calculated B12 as A12 in the above expression (1). Similarly, the mixing coefficient calculation means 14-2 calculates the coefficients B21 and B22 satisfying the above expression (4), by using the inputted reference signal power Ps2(n) and the inputted actual recording signal powers Px1(n) and Px2(n). Here, from the above expression (4), the reference signal power Ps2(n) is represented by a linear combination of the actual recording signal power Px1(n) multiplied by the coefficient B21 and the actual recording signal power Px2(n) multiplied by the coefficient B22. Therefore, by using adaptive equalization algorithm, while the reference signal power Ps2(n) (n= . . . n−1, n, n+1, . . . ) and the actual recording signal powers Px1(n) and Px2(n) are inputted to the mixing coefficient calculation means 14-2 in chronological order, the mixing coefficient calculation means 14-2 can calculate the coefficients B21 and B22 such that the sum of the power levels of the actual recording signal powers Px1(n) and Px2(n) respectively multiplied by the coefficients B21 and B22 is equal to the power level of the reference signal power Ps2(n). The mixing coefficient calculation means 14-2 outputs, to the signal calculation means 15, the calculated B21 as A21 in the above expression (1), and the calculated B22 as A22 in the above expression (1).

Note that LMS performing sequential updating, principal component analysis performing sequential updating by using statistical information, independent component analysis also performing sequential updating by using statistical information, or the like can be used as the above adaptive equalization algorithm. As an example, processing performed by the mixing coefficient calculation means 14-1 when LMS is used as adaptive equalization algorithm will be described. When an estimated error is denoted by e(n), the estimated error e(n) is represented by an expression (6).

[Number 6]

$$e(n)=Ps1(n)\cdot[B11(n)\cdot Px1(n)+B12(n)\cdot Px2(n)] \quad (6)$$

In addition, when a coefficient vector to be estimated is denoted by B(n)=[1, B11(n), B12(n)], an input signal is denoted by X(n)=[Ps1(n), Px1(n), Px2(n)], and a step size is denoted by μ, the coefficient vector B(n) to be estimated is sequentially updated in accordance with an expression (7).

[Number 7]

$$B(n+1)=B(n)+2\mu e(n)X(n) \quad (7)$$

When the mixing coefficient calculation means 14-1 has sequentially updated the coefficient vector in accordance with the expression (7) until the estimated error e(n) has become minimum, the coefficients B11 and B12 included in the coefficient vector become the coefficients B11 and B12 satisfying the above expression (4). Note that after estimating the coefficients B11, B12, B21, and B22 for each sample (n), the mixing coefficient calculation means 14-1 may further average the coefficients B11, average the coefficients B12, average the coefficients B21, and average the coefficients B22, the number of each set of the coefficients to be averaged being a predetermined time sample number, and may gradually update the averaged coefficients B11, the averaged coefficients B12, the averaged coefficients B21, and the averaged coefficients B22.

Next, referring to FIG. 5, processing performed by the signal calculation means 15 will be described. FIG. 5 is a diagram specifically showing a configuration of the signal calculation means 15. As shown in FIG. 5, the signal calculation means 15 includes variable gain devices 151 to 154, and adders 155 and 156. The variable gain devices 151 to 154 are amplifiers capable of varying the gains. The variable gain device 151 sets, as the gain, the coefficient A11 outputted by the mixing coefficient calculation means 14-1, and amplifies the actual recording signal x1(n) A11-fold. The variable gain device 152 sets, as the gain, the coefficient A12 outputted by the mixing coefficient calculation means 14-1, and amplifies the actual recording signal x2(n) A12-fold. The adder 155 adds the actual recording signal x1(n) amplified A11-fold, which is outputted from the variable gain device 151, to the actual recording signal x2(n) amplified A12-fold, which is outputted from the variable gain device 152, and thereby calculates the output signal y1(n) as the R-channel signal. Similarly, the variable gain device 153 sets, as the gain, the coefficient A21 outputted by the mixing coefficient calculation means 14-2, and amplifies the actual recording signal x1(n) A21-fold. The variable gain device 154 sets, as the gain, the coefficient A22 outputted by the mixing coefficient calculation means 14-2, and amplifies the actual recording signal x2(n) A22-fold. The adder 156 adds the actual recording signal x1(n) amplified A21-fold, which is outputted from the variable gain device 153, to the actual recording signal x2(n) amplified A22-fold, which is outputted from the variable gain device 152, and thereby calculates the output signal y2(n) as the L-channel signal.

As described above, in the present embodiment, reference signals realizing sound image localization, which are from the reference microphones 11-1 and 11-2, are re-created in a simulated manner by using actual recording signals from the actual recording microphones 10-1 and 10-2 which can freely be moved. Thus, even when an actual recording microphone which can freely be moved is used, the R-channel signal and the L-channel signal which realize sound image localization can be generated without performing processing using information about the current position of the actual recording microphone. As a result, the various problems which arise owing to processing using information about the current position of a microphone as in the conventional sound collecting device described above, do not arise.

In addition, in the present embodiment, since the actual recording microphones 10-1 and 10-2 can freely be placed, the actual recording microphones 10-1 and 10-2 can also be placed in the vicinity of the speakers 2-1 and 2-2 as shown in FIG. 1. Therefore, the signal-to-noise (hereinafter, referred to as S/N) ratio of each actual recording signal becomes preferable, and multichannel signals having preferable S/N ratios can be generated.

Note that although the actual recording microphone 10-1 is placed in the vicinity of and in front of the speaker 2-1 and the actual recording microphone 10-2 is placed in the vicinity of and in front of the speaker 2-2 in the above description, they may be placed at any position. Note that, if it is desired to generate multichannel signals having preferable S/N ratios, the actual recording microphones 10-1 and 10-2 need to be placed at positions as near to the speakers 2-1 and 2-2 as possible. In addition, if it is desired to generate multichannel signals having S/N ratios more preferable than in the conventional sound collecting device which is configured by only the reference microphones 11-1 and 11-2, the actual recording microphones 10-1 and 10-2 need to be placed at positions nearer to the speakers 2-1 and 2-2 (sound source) than the reference microphones 11-1 and 11-2 are. By the actual recording microphones 10-1 and 10-2 being thus placed, the sound signals x1(n) and x2(n) from the actual recording microphones 10-1 and 10-2 have more preferable S/N ratios than the sound signals s1(n) and s2(n) from the reference microphones 11-1 and 11-2. In addition, the actual recording microphones 10-1 and 10-2 may be configured by nondirectional microphones, or may be configured by microphones having directionalities. In addition, in the case where the actual recording microphones 10-1 and 10-2 are configured by microphones having directionalities, the actual recording microphones 10-1 and 10-2 may be placed so as to concentrate at one position such that the main axes of the directionalities of the actual recording microphones 10-1 and 10-2 are directed in the directions different from each other.

Note that although, in the above description, the level calculation means 12-1 and 12-2, and the reference level calculation means 13-1 and 13-2 calculate the power levels of the respective inputted signals, the present invention is not limited thereto. The level calculation means 12-1 and 12-2, and the reference level calculation means 13-1 and 13-2 may calculate the amplitude levels of the respective inputted signals.

Note that the angle between the main axes of the directionalities of the reference microphones 11-1 and 11-2, shown in FIG. 3, is not limited to 180 degrees, and the angle may be any degree other than 0 degree. In addition, although, in the above description, the reference microphones 11-1 and 11-2 are configured by microphones having unidirectionalities, the present invention is not limited thereto. The reference microphones 11-1 and 11-2 may be configured so as to form unidirectionalities by performing signal processing for nondirectional microphones.

Figure 7:
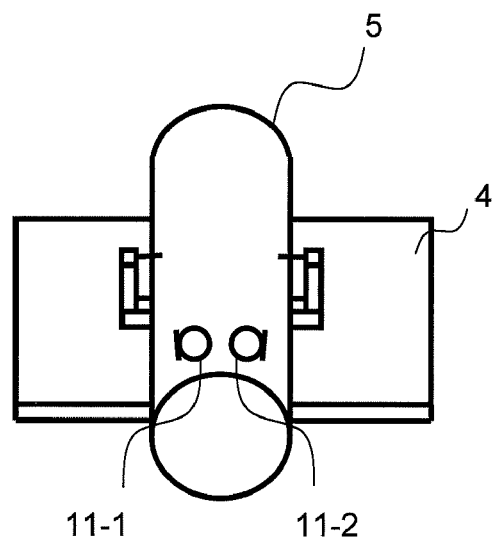
FIG. 7 is a diagram showing the reference microphones 11-1 and 11-2 directly attached to the camera 5.

Note that although, in FIG. 3, the reference microphones 11-1 and 11-2 are placed at positions different from each other, the present invention is not limited thereto. The reference microphones 11-1 and 11-2 may be placed at the same position while the main axes of the directionalities of the reference microphones 11-1 and 11-2 are directed in the directions corresponding to the respective channels. Even in this case, the same effect as in the reference microphones 11-1 and 11-2 placed as shown in FIG. 3 can be obtained. In addition, the reference microphones 11-1 and 11-2 may be directly attached to the camera 5 as shown in FIG. 7. FIG. 7 is a diagram showing the reference microphones 11-1 and 11-2 directly attached to the camera 5. In this case, even if the shooting area is changed by the camera 5 being turned, the difference between the direction in which a video image transmitted to the transmission destination is shot, and the direction in which the reference microphones 11-1 and 11-2 collect sounds, does not change. As a result, multichannel signals can be obtained such that the video image and the position of a speaker are always matched. In addition, when the speaker 2-1 or 2-2 sets a conference system, it is not necessary to separately place the reference microphones 11-1 and 11-2, and the camera 5. Thus, it becomes possible to more easily set a conference system, and to prevent sound quality of generated multichannel signals from being changed depending on the setting.

Figure 6:
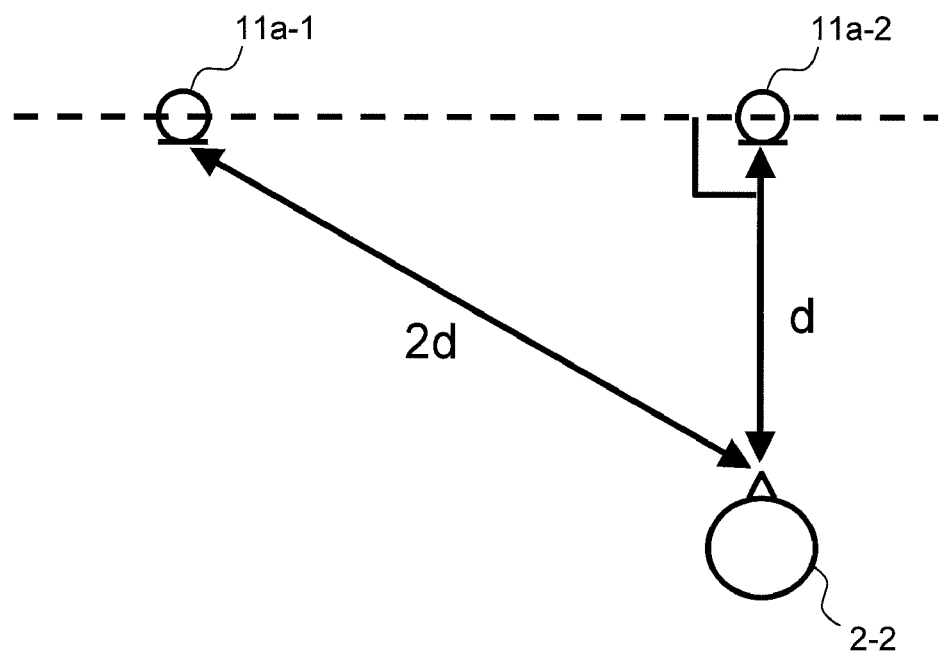
FIG. 6 is a diagram showing an example of placement of the reference microphones 11-1 and 11-2 configured by non-directional microphones.

Note that although, in FIG. 3, the reference microphones 11-1 and 11-2 are configured by microphones having directionalities, the present invention is not limited thereto. The reference microphones 11-1 and 11-2 may be configured by nondirectional microphones, and may be placed as shown in FIG. 6. FIG. 6 is a diagram showing an example of placement of the reference microphones 11-1 and 11-2 configured by nondirectional microphones. In FIG. 6, the reference microphone 11-1 configured by a nondirectional microphone is denoted by 11a-1, and the reference microphone 11-2 configured by a nondirectional microphone is denoted by 11a-2. As an example, the distance between the reference microphone 11a-2 and the speaker 2-2 is denoted by d. Then, it is assumed that the reference microphone 11a-1 is placed at a position which forms a right triangle with the positions of the reference microphone 11a-2 and the speaker 2-2 as shown in FIG. 6. At this time, it is more desirable that the reference microphone 11a-1 is placed at the position which is 2d distant from the speaker. Thus, there arises a difference of 6 dB between the level of a sound collected by the reference microphone 11a-1 from the speaker 2-2, and the level of a sound collected by the reference microphone 11a-2 from the speaker 2-2. Therefore, the same effect as in the placement shown in FIG. 3, or a better effect can be obtained. Note that if it is desired to collect sounds so as to obtain multichannel signals which realize clear sound image localization, the reference microphone 11a-1 needs to be placed at a position which is at least 1.4d distant from the speaker 2-1. In addition, the reference microphones 11-1 and 11-2 may be configured by four nondirectional microphones capable of collecting sounds from two directions of the R-channel and the L-channel by performing array processing. Thus, one reference microphone may be configured by a plurality of microphones.

Note that, in the above description, the reference microphones 11-1 and 11-2, and the actual recording microphones 10-1 and 10-2 are placed at positions different from each other. Therefore, actually, the timing at which the reference microphones 11-1 and 11-2 collect a sound produced by the speaker 2-1 or 2-2 does not always coincide with the timing at which the actual recording microphones 10-1 and 10-2 collect the sound. Therefore, in some cases, the mixing coefficients (B11, B12, B21, and B22) estimated by the mixing coefficient calculation means 14-1 and 14-2 cannot become coefficients satisfying the above expression (4). Accordingly, a time interval in which the levels of signals of collected sounds are averaged, the time interval being set for each of the level calculation means 12-1 and 12-2 and the reference level calculation means 13-1 and 13-2, is adjusted such that the difference between the timings can be eliminated. Specifically, the time interval set for each of the level calculation means 12-1 and 12-2 and the reference level calculation means 13-1 and 13-2 is set to a time interval determined in accordance with the difference between: the largest distance among distances each of which is the distance from the reference microphone 11-1 or 11-2 to the speaker 2-1 or 2-2; and the smallest distance among distances each of which is the distance from the actual recording microphone 10-1 or 10-2 to the speaker 2-1 or 2-2. Here, practically, the reference microphones 11-1 and 11-2 are often placed at a position which is 2 to 4 m distant from the speaker 2-1 and 2-2, and the actual recording microphones 10-1 and 10-2 are often placed at a position which is 50 cm distant from the speakers 2-1 and 2-2. In this case, the difference between the above largest distance to the reference microphone and the above smallest distance to the actual recording microphone is 1.5 to 3.5 m. Since it takes about 3 msec for a sound wave to travel a distance of 1 m, it takes about 11 msec for a sound wave to travel 3.5 in, for example. Therefore, in this case, the above time interval in which the levels of signals are averaged needs to be adjusted to 11 msec or more. Thus, by adjusting the time interval such that the difference between the timings can be eliminated, the accuracy of the mixing coefficients estimated by the mixing coefficient calculation means 14-1 and 14-2 can be enhanced. Note that the difference between the above largest distance to the reference microphone and the above smallest distance to the actual recording microphone can be obtained by monitoring the sound pressure levels of sounds collected by the reference microphone and the actual recording microphone, and figuring out the positional relationship of the reference microphone and the actual recording microphone.

Note that although, in the above description, the R-channel signal and the L-channel signal are generated as multichannel signals, and two reference microphones are provided, the present invention is not limited thereto. For example, three reference microphones may be provided to further generate a C (center) channel signal. Thus, the reference microphones are provided in accordance with the number of channels. Note that if the number of channels is N (N is a natural number), N reference level calculation means and N mixing coefficient calculation means are provided to the configuration shown in FIG. 2.

Note that although, in the above description, two actual recording microphones are provided, the present invention is not limited thereto. Only one actual recording microphone may be provided, or three or more actual recording microphones may be provided. Note that if M (M is a natural number) actual recording microphones are provided, M level calculation means are provided to the configuration shown in FIG. 2, and each of the M level calculation means outputs an actual recording signal to the mixing coefficient calculation means. Then, each of the mixing coefficient calculation means calculates M coefficients. For example, if M is 1, the mixing coefficient calculation means 14-1 calculates only the coefficient A11, and the mixing coefficient calculation means 14-2 calculates only the coefficient A21. If increased number of actual recording microphones are provided, a sound image realized by multichannel signals generated by the signal calculation means 15 becomes clear, and a sound collection area in which an actual recording signal having a preferable S/N ratio can be obtained is expanded.

Second Embodiment

Figure 8:
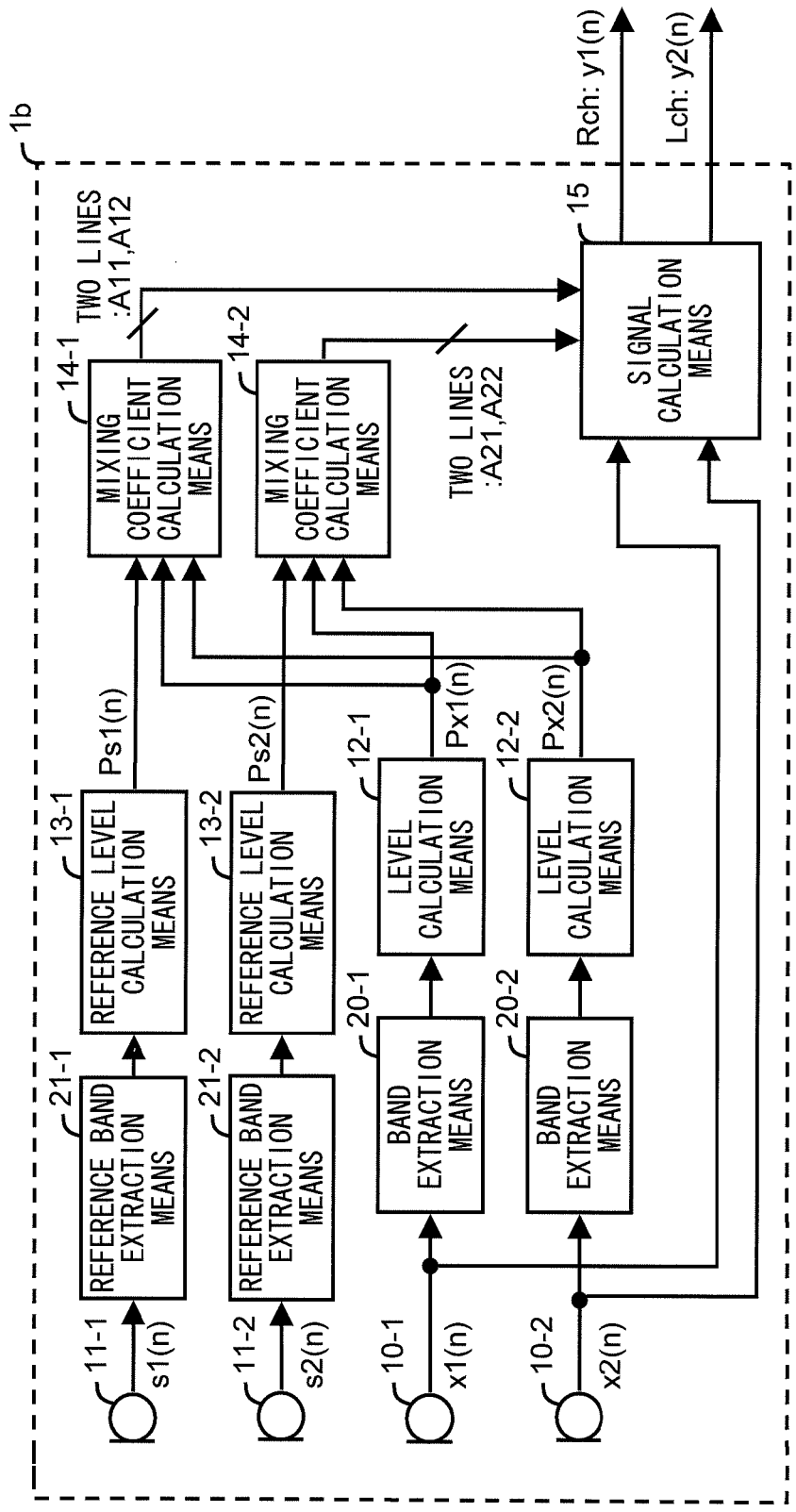
FIG. 8 is a diagram showing a configuration of a sound collecting device 1b according to a second embodiment.

Referring to FIG. 8, a sound collecting device according to a second embodiment of the present invention will be described. FIG. 8 is a diagram showing a configuration of a sound collecting device 1b according to the second embodiment. The components of the sound collecting device 1b shown in FIG. 8 are provided such that the sound collecting device 1 shown in FIG. 1 and FIG. 2 is replaced by the sound collecting device 1b. In addition, the sound collecting device 1b is different from the sound collecting device 1 shown in FIG. 1 only in that band extraction means 20-1 and 20-2, and reference band extraction means 21-1 and 21-2 are newly added to the sound collecting device 1b. Hereinafter, the difference will be mainly described.

The band extraction means 20-1 extracts, among actual recording signals from the actual recording microphone 10-1, only an actual recording signal in a predetermined frequency band, and outputs the extracted signal to the level calculation means 12-1. Similarly, the band extraction means 20-2 extracts, among actual recording signals from the actual recording microphone 10-2, only an actual recording signal in a predetermined frequency band, and outputs the extracted signal to the level calculation means 12-2. In addition, the reference band extraction means 21-1 extracts, among reference signals from the reference microphone 11-1, only a reference signal in a predetermined frequency band, and outputs the extracted signal to the reference level calculation means 13-1. Similarly, the reference band extraction means 21-2 extracts, among reference signals from the reference microphone 11-2, only a reference signal in a predetermined frequency band, and outputs the extracted signal to the reference level calculation means 13-2.

The predetermined frequency bands set for the band extraction means 20-1 and 20-2, and the reference band extraction means 21-1 and 21-2 are the same. For example, a band (e.g., 1 kHz to 4 kHz) corresponding to sounds produced by the speakers 2-1 and 2-2, in which a relatively low level of interior noise is included, is used as the predetermined frequency band. Alternatively, for example, a band obtained by considering directionality characteristics (frequency characteristics of directionalities) of the reference microphones 11-1 and 11-2, and the actual recording microphones 10-1 and 10-2, may be used for the predetermined frequency band.

Specifically, a band which allows all the microphones to stably obtain directionalities is used as the predetermined frequency band. By using the predetermined frequency band as described above, noise other than sounds produced by the speakers 2-1 and 2-2, which is included in the reference signal and the actual recording signal inputted to the mixing coefficient calculation means 14-1 and 14-2, can be reduced.

As described above, in the present embodiment, noise other than sounds produced by the speakers 2-1 and 2-2, which is included in the reference signal and the actual recording signal inputted to the mixing coefficient calculation means 14-1 and 14-2, can be reduced. As a result, the accuracy of the mixing coefficients calculated by the mixing coefficient calculation means 14-1 and 14-2 is enhanced, and multichannel signals which realize clearer sound image localization can be generated.

Third Embodiment

Figure 9:
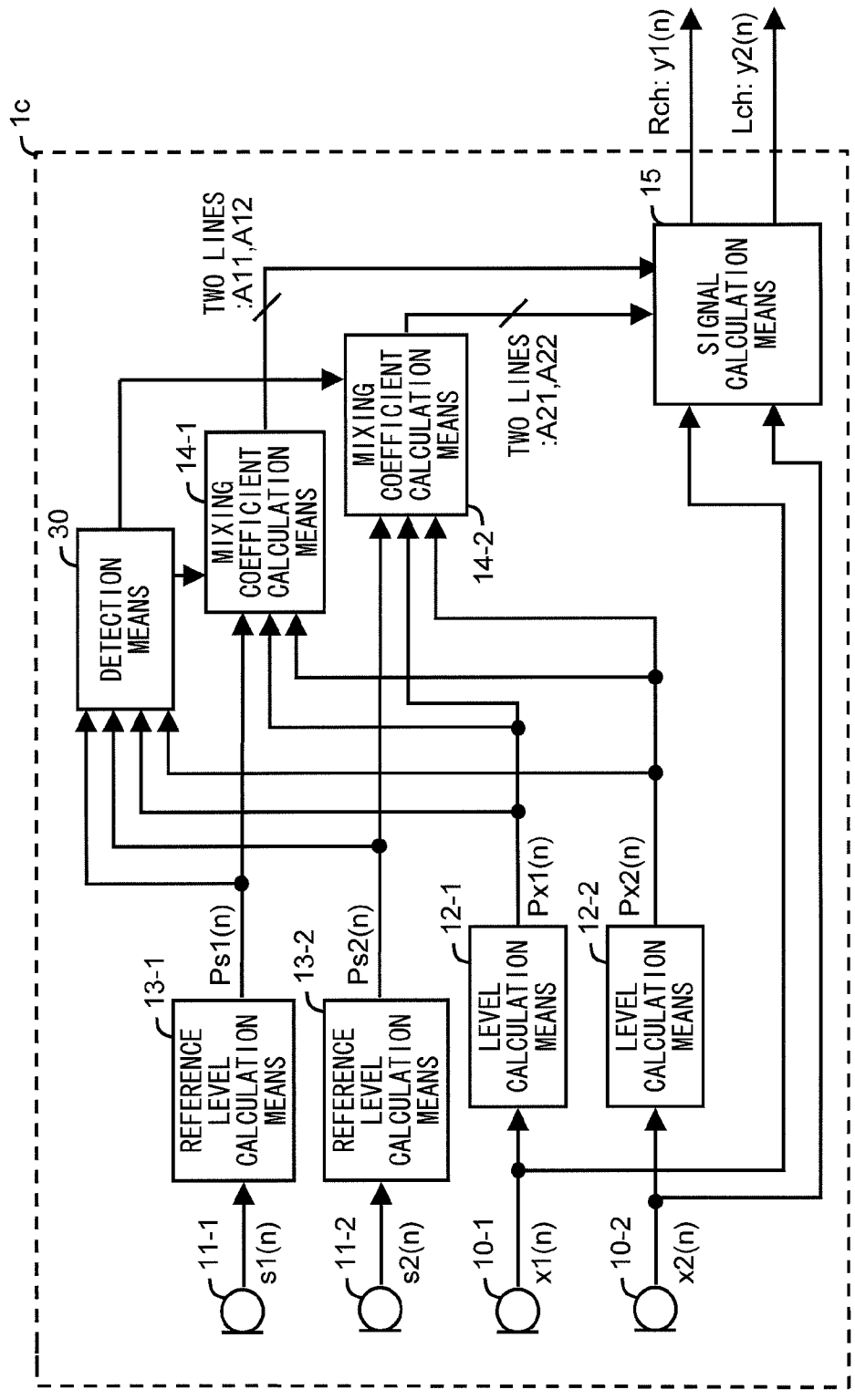
FIG. 9 is a diagram showing a configuration of a sound collecting device 1c according to a third embodiment.

Referring to FIG. 9, a sound collecting device according to a third embodiment of the present invention will be described. FIG. 9 is a diagram showing a configuration of a sound collecting device 1c according to the third embodiment. The components of the sound collecting device 1c shown in FIG. 9 are provided such that the sound collecting device 1 shown in FIG. 1 and FIG. 2 is replaced by the sound collecting device 1c. In addition, the sound collecting device 1c is different from the sound collecting device 1 shown in FIG. 1 only in that a determination means 30 is newly added to the sound collecting device 1c. Hereinafter, the difference will be mainly described.

As shown in FIG. 1, the speakers 2-1 and 2-2 are present near the actual recording microphones 10-1 and 10-2. Therefore, the actual recording signal powers $Px1(n)$ and $Px2(n)$ calculated by the level calculation means 12-1 and 12-2 are larger than the reference signal powers $Ps1(n)$ and $Ps2(n)$ calculated by the reference level calculation means 13-1 and 13-2. However, for example, when a source of noise is present near the reference microphones 11-1 and 11-2, or when the speakers 2-1 and 2-2 are not speaking and a sound comes to the reference microphones 11-1 and 11-2 from the direction opposite to the direction in which the speakers 2-1 and 2-2 are present, the reference signal powers $Ps1(n)$ and $Ps2(n)$ calculated by the reference level calculation means 13-1 and 13-2 are larger than the actual recording signal powers $Px1(n)$ and $Px2(n)$ calculated by the level calculation means 12-1 and 12-2. In this case, since the accuracy of the mixing coefficients estimated by the mixing coefficient calculation means 14-1 and 14-2 is lowered, it is desired not to update the mixing coefficients.

Specifically, the reference signal powers $Ps1(n)$ and $Ps2(n)$ calculated by the reference level calculation means 13-1 and 13-2, and the actual recording signal powers $Px1(n)$ and $Px2(n)$ calculated by the level calculation means 12-1 and 12-2 are inputted to the determination means 30. The determination means 30 sequentially determines, for each time sample (n), whether or not the larger one of the levels of the inputted reference signal powers $Ps1(n)$ and $Ps2(n)$ is larger than the larger one of the levels of the inputted actual recording signal powers $Px1(n)$ and $Px2(n)$. Then, only when the determination means 30 determines that the larger one of the levels of the reference signal powers is larger than the larger one of the levels of the actual recording signal powers, the mixing coefficient calculation means 14-1 and 14-2 stop sequential updating of the coefficients. Then, when sequential updating of the coefficients is stopped, the signal calculation means 15 calculates multichannel signals by using the coefficients which have been calculated in the past by the mixing coefficient calculation means 14-1 and 14-2.

As described above, in the present embodiment, the mixing coefficients are prevented from being erroneously updated owing to a sound other than sounds produced by the speakers 2-1 and 2-2. As a result, multichannel signals which stably realize sound image localization can be generated.

Note that the determination means 30 may sequentially determines, for each time sample (n), whether or not the sum of the levels of the inputted reference signal powers $Ps1(n)$ and $Ps2(n)$ is larger than the sum of the levels of the inputted actual recording signal powers $Px1(n)$ and $Px2(n)$. In this case, only when the determination means 30 determines that the sum of the levels of the reference signal powers is larger than the sum of the levels of the actual recording signal powers, the mixing coefficient calculation means 14-1 and 14-2 stop sequential updating of the coefficients. Thus, the same effect as in the case where the determination means 30 performs the determination using the larger one of the powers, can be obtained.

Note that the determination means 30 may perform the determination by using the amplitude levels of the reference signals and the actual recording signals, instead of the power levels of the reference signals and the actual recording signals.

Fourth Embodiment

Figure 10:
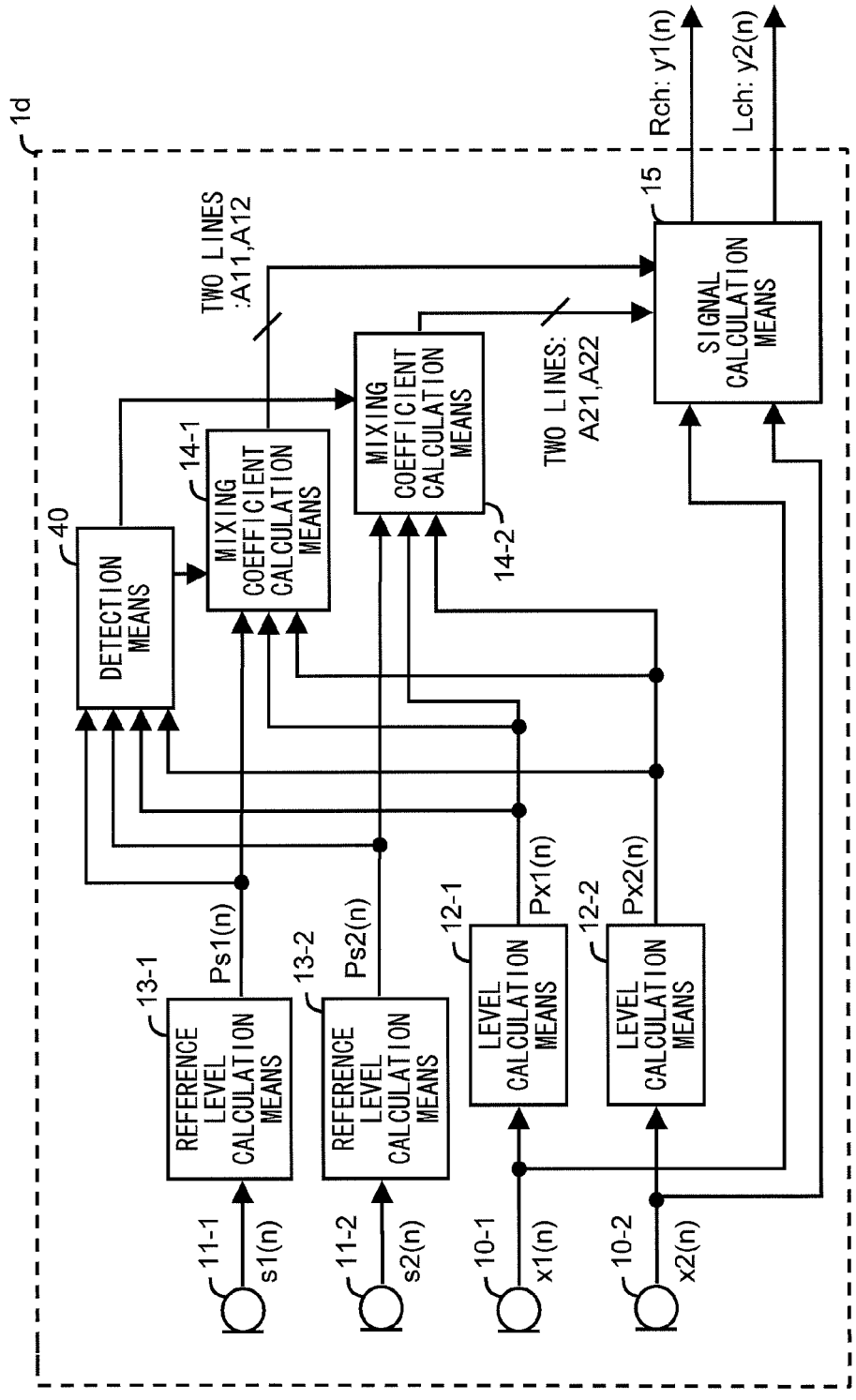
FIG. 10 is a diagram showing a configuration of a sound collecting device 1d according to a fourth embodiment.

Referring to FIG. 10, a sound collecting device according to a fourth embodiment of the present invention will be described. FIG. 10 is a diagram showing a configuration of a sound collecting device 1d according to the fourth embodiment. The components of the sound collecting device 1d shown in FIG. 10 are provided such that the sound collecting device 1 shown in FIG. 1 and FIG. 2 is replaced by the sound collecting device 1d. In addition, the sound collecting device 1d is different from the sound collecting device 1c shown in FIG. 9 only in that the determination means 30 is replaced by a determination means 40. Hereinafter, the difference will be mainly described.

The reference signal powers $Ps1(n)$ and $Ps2(n)$ calculated by the reference level calculation means 13-1 and 13-2, and the actual recording signal powers $Px1(n)$ and $Px2(n)$ calculated by the level calculation means 12-1 and 12-2 are inputted to the determination means 40. The determination means 40 sequentially determines, for each time sample (n), whether or not the speaker 2-1 or 2-2 is producing a sound, based on the inputted reference signal powers $Ps1(n)$ and $Ps2(n)$, and the inputted actual recording signal powers $Px1(n)$ and $Px2(n)$. Then, only when the determination means 40 determines that the speaker 2-1 or 2-2 is producing a sound, the mixing coefficient calculation means 14-1 and 14-2 stop sequential updating of the coefficients. Then, when sequential updating of the coefficients is stopped, the signal calculation means 15 calculates multichannel signals by using the coefficients which have been calculated in the past by the mixing coefficient calculation means 14-1 and 14-2.

As described above, in the present embodiment, the mixing coefficients are prevented from being erroneously updated owing to a sound other than sounds produced by the speakers 2-1 and 2-2. As a result, multichannel signals which stably realize sound image localization can be generated.

Note that one example of specific methods of determining whether or not the speaker 2-1 or 2-2 is producing a sound is a method of determining whether or not all of the levels of the reference signal powers $Ps1(n)$ and $Ps2(n)$, and the actual recording signal powers $Px1(n)$ and $Px2(n)$ are equal to or larger than a predetermined level. When all of the levels are equal to or larger than a predetermined level, the determination means 40 determines that the speaker 2-1 or 2-2 is producing a sound. Here, the actual recording microphones 10-1 and 10-2 are placed at positions nearer to the speakers 2-1 and 2-2 than the reference microphones 11-1 and 11-2 are. Therefore, S/N ratios are different between the reference signal and the actual recording signal. Accordingly, for example, the determination means 40 may determine, for a pair of the reference microphones 11-1 and 11-2, whether or not the levels of the reference signal powers are equal to or larger than a predetermined level, and may determine, for a pair of the actual recording microphones 10-1 and 10-2, whether or not the levels of the actual recording signal powers are equal to or larger than a predetermined level. Alternatively, for example, the determination means 40 may determine, for each of the reference microphones 11-1 and 11-2, whether or not the level of the reference signal power is equal to or larger than a predetermined level, and may determine, for each of the actual recording microphones 10-1 and 10-2, whether or not the level of the actual recording signal power is equal to or larger than a predetermined level. Moreover, in this case, the determination means 40 may perform a final determination by coordinating the results of the above four determinations. For example, when the results of three or more of the above four determinations indicate that the levels are equal to or larger than a predetermined level, the determination means 40 may determine that the levels are equal to or larger than the predetermined level, the result of the determination being a final determination result.

Note that another example of specific methods of determining whether or not the speaker 2-1 or 2-2 is producing a sound is a method of determining whether or not all of the levels of the reference signal powers $Ps1(n)$ and $Ps2(n)$, and the actual recording signal powers $Px1(n)$ and $Px2(n)$ are varying over a range larger than a predetermined variation range. Since surrounding noise is steady, the variation range of the level of surrounding noise is small in comparison with a sound of the speaker 2-1 or 2-2. Therefore, when all of the levels of the reference signal powers $Ps1(n)$ and $Ps2(n)$, and the actual recording signal powers $Px1(n)$ and $Px2(n)$ are varying over a range larger than a predetermined variation range, the determination means 40 determines that the speaker 2-1 or 2-2 is producing a sound.

Note that the determination means 40 may perform the determination by using the amplitude levels of the reference signal and the actual recording signal, instead of the power levels of the reference signal and the actual recording signal.

Fifth Embodiment

Figure 11:
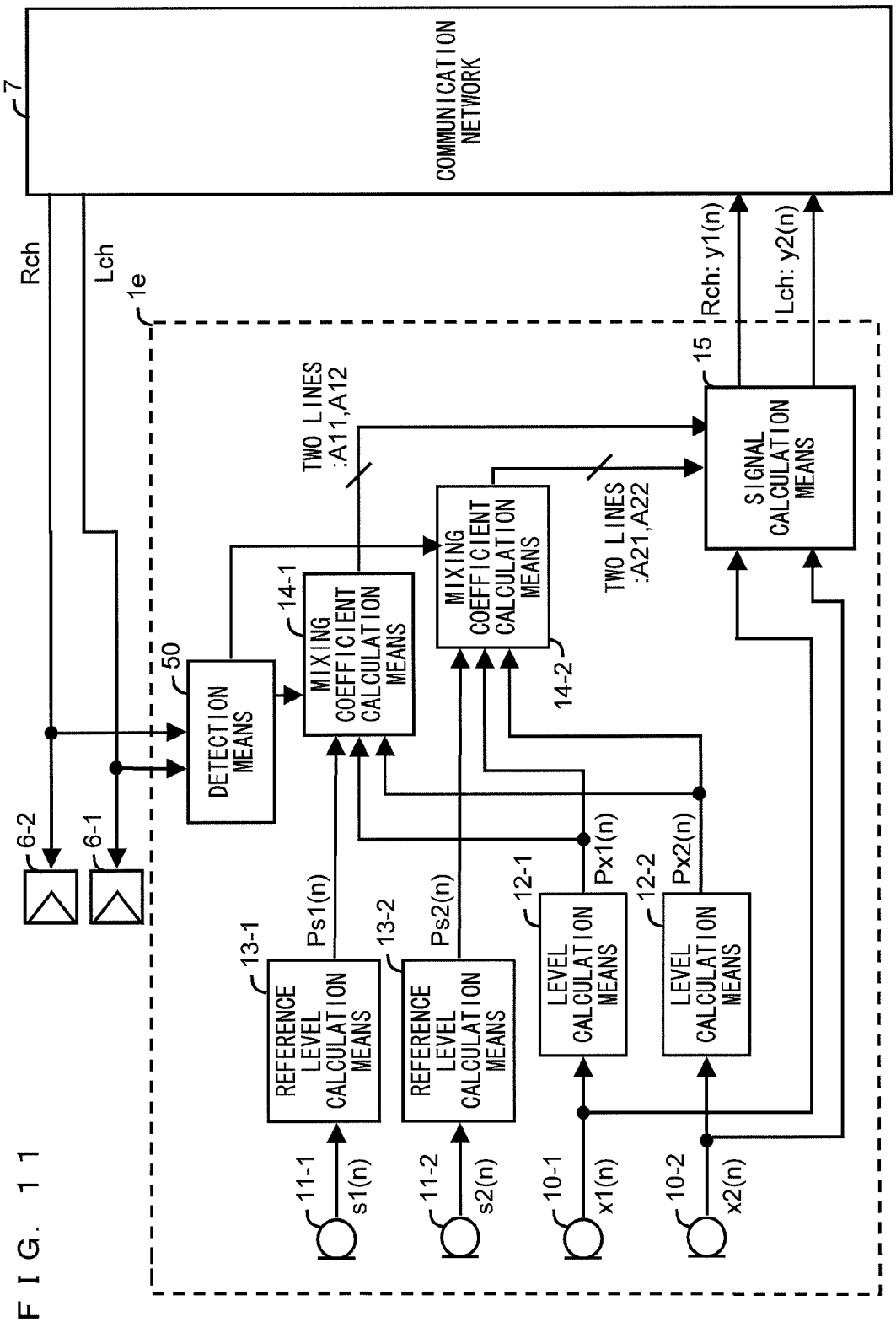
FIG. 11 is a diagram showing a configuration of a sound collecting device 1e according to a fifth embodiment.

Referring to FIG. 11, a sound collecting device according to a fifth embodiment of the present invention will be described. FIG. 11 is a diagram showing a configuration of a sound collecting device 1e according to the fifth embodiment. The components of the sound collecting device 1e shown in FIG. 11 are provided such that the sound collecting device 1 shown in FIG. 1 and FIG. 2 is replaced by the sound collecting device 1e. Note that, in FIG. 11, for the purpose of description, the loudspeakers 6-1 and 6-2, and the communication network 7 shown in FIG. 2, are shown. In addition, the sound collecting device 1e is different from the sound collecting device 1 shown in FIG. 1 only in that the determination means 50 is newly added to the sound collecting device 1e. Hereinafter, the difference will be mainly described.

Multichannel signals from the transmission destination, which are inputted to the loudspeakers 6-1 and 6-2 via the communication network 7, are inputted to the determination means 50. The determination means 50 sequentially determines, for each time sample (n), whether or not a speaker at the transmission destination is producing a sound, based on the inputted multichannel signals. Then, only when the determination means 50 determines that a speaker at the transmission destination is producing a sound, the mixing coefficient calculation means 14-1 and 14-2 stop sequential updating of the coefficients. Then, when sequential updating of the coefficients is stopped, the signal calculation means 15 calculates multichannel signals by using the coefficients which have been calculated in the past by the mixing coefficient calculation means 14-1 and 14-2.

As described above, in the present embodiment, the mixing coefficient calculation means 14-1 and 14-2 stop sequential updating of the coefficients, based on whether or not a speaker at the transmission destination is producing a sound. Here, a sound produced by a speaker at the transmission destination, which is outputted from the loudspeakers 6-1 and 6-2, is a sound other than sounds produced by the speakers 2-1 and 2-2. Therefore, by stopping sequential updating of the coefficients when a speaker at the transmission destination is producing a sound, the coefficients are prevented from being erroneously updated, as in the fourth embodiment. As a result, multichannel signals which stably realize sound image localization can be generated.

Note that one example of specific methods of determining whether or not a speaker at the transmission destination is producing a sound is a method of determining whether or not all of the levels of multichannel signals from the transmission destination which are inputted to the loudspeakers 6-1 and 6-2 are equal to or larger than a predetermined level. When all of the levels are equal to or larger than a predetermined level, the determination means 50 determines that a speaker at the transmission destination is producing a sound. Alternatively, a method of determining whether or not all of the levels of multichannel signals from the transmission destination are varying over a range larger than a predetermined variation range. Since surrounding noise at the transmission destination is steady, the variation range of the level of surrounding noise at the transmission destination is small in comparison with a sound of a speaker at the transmission destination. Therefore, when all of the levels of multichannel signals from the transmission destination are varying over a range larger than a predetermined variation range, the determination means 50 determines that a speaker at the transmission destination is producing a sound.

Note that the determination means 50 may perform the determination by using the power levels of multichannel signals from the transmission destination, or may perform the determination by using the amplitude levels of multichannel signals from the transmission destination.

Sixth Embodiment

Figure 12:
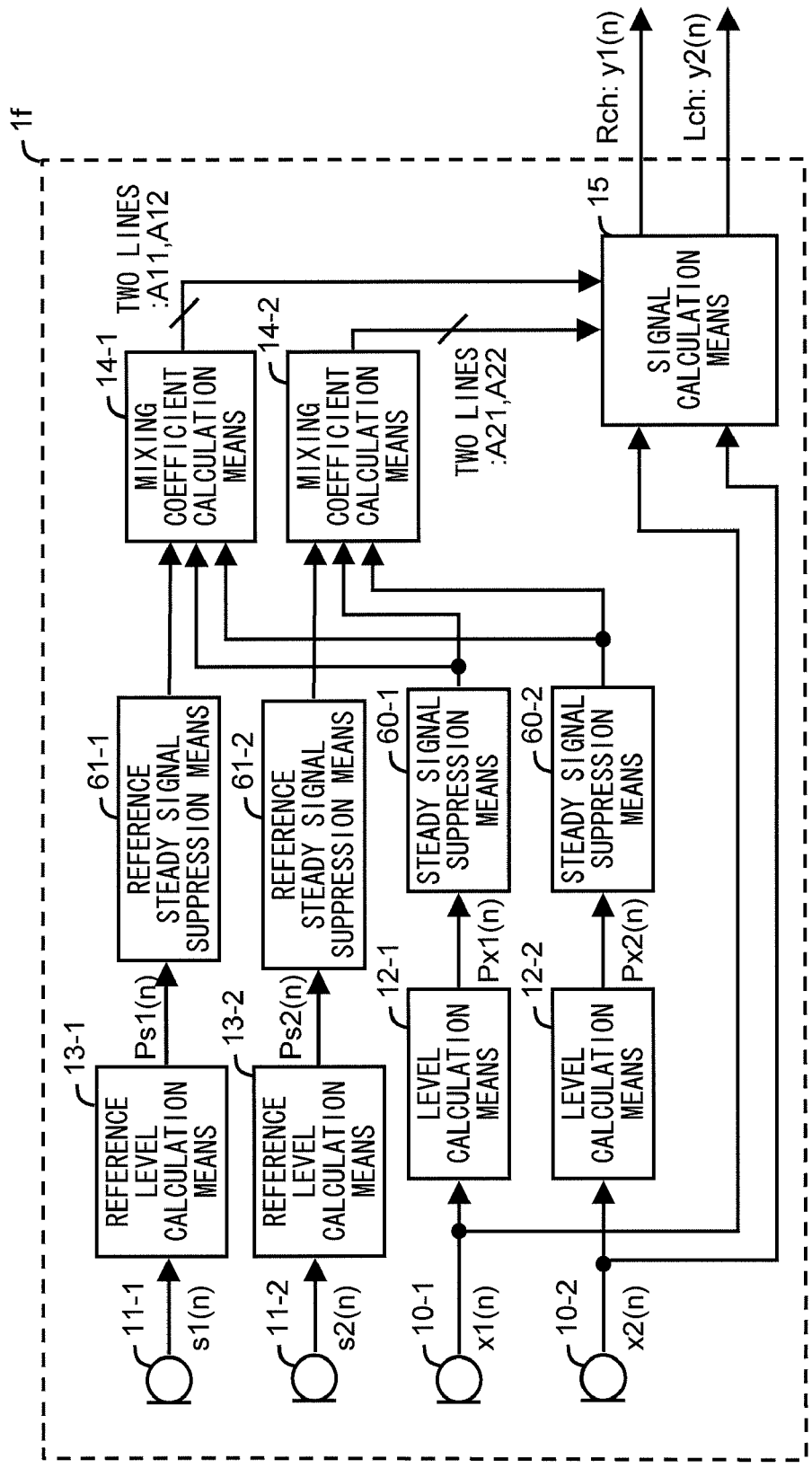
FIG. 12 is a diagram showing a configuration of a sound collecting device 1f according to a sixth embodiment.

Referring to FIG. 12, a sound collecting device according to a sixth embodiment of the present invention will be described. FIG. 12 is a diagram showing a configuration of a sound collecting device 1f according to the sixth embodiment. The components of the sound collecting device 1f shown in FIG. 12 are provided such that the sound collecting device 1 shown in FIG. 1 and FIG. 2 is replaced by the sound collecting device 1f. In addition, the sound collecting device 1f is different from the sound collecting device 1 shown in FIG. 1 only in that steady signal suppression means 60-1 and 60-2, reference steady signal suppression means 61-1 and 61-2 are newly added to the sound collecting device 1f. Hereinafter, the difference will be mainly described.

Since the reference microphones 11-1 and 11-2 are provided to the camera 5 or the monitor 4, they are placed at positions distant from the speakers 2-1 and 2-2, to a certain degree. Therefore, the S/N ratio of the reference signal is deteriorated owing to steady surrounding noise. In addition, the actual recording microphones 10-1 and 10-2 can be placed near a source of noise such as a projector (not shown). In this case, the S/N ratio of the actual recording signal is deteriorated. Therefore, in calculation processing performed by the mixing coefficient calculation means 14-1 and 14-2, the mixing coefficients to be calculated are influenced by surrounding noise. Accordingly, the influence of surrounding noise is reduced by using the steady signal suppression means 60-1 and 60-2, and the reference steady signal suppression means 61-1 and 61-2.

Specifically, the steady signal suppression means 60-1 subtracts a steady noise signal from the actual recording signal power $Px1(n)$ outputted by the level calculation means 12-1, and outputs the resultant signal to the mixing coefficient calculation means 14-1 and 14-2. Similarly, the steady signal suppression means 60-2 subtracts a steady noise signal from the actual recording signal power $Px2(n)$ outputted by the level calculation means 12-2, and outputs the resultant signal to the mixing coefficient calculation means 14-1 and 14-2. In addition, the reference steady signal suppression means 61-1 subtracts a steady noise signal from the reference signal power $Ps1(n)$ outputted by the reference level calculation means 13-1, and outputs the resultant signal to the mixing coefficient calculation means 14-1. Similarly, the reference steady signal suppression means 61-2 subtracts a steady noise signal from the reference signal power $Ps2(n)$ outputted by the reference level calculation means 13-2, and outputs the resultant signal to the mixing coefficient calculation means 14-2.

As described above, in the present embodiment, the influence of surrounding noise is reduced. As a result, multichannel signals which stably realize sound image localization can be generated.

Note that one example of specific methods of subtracting a steady noise signal is a method of subtracting a component of a predetermined level. In addition, another example is a method of: specifying a component whose level varies in a small range by monitoring the actual recording signal powers $Px1(n)$ and $Px2(n)$ from the level calculation means 12-1 and 12-2, and the reference signal powers $Ps1(n)$ and $Ps2(n)$ from the reference level calculation means 13-1 and 13-2; and subtracting the specified component.

Seventh Embodiment

Figure 13:
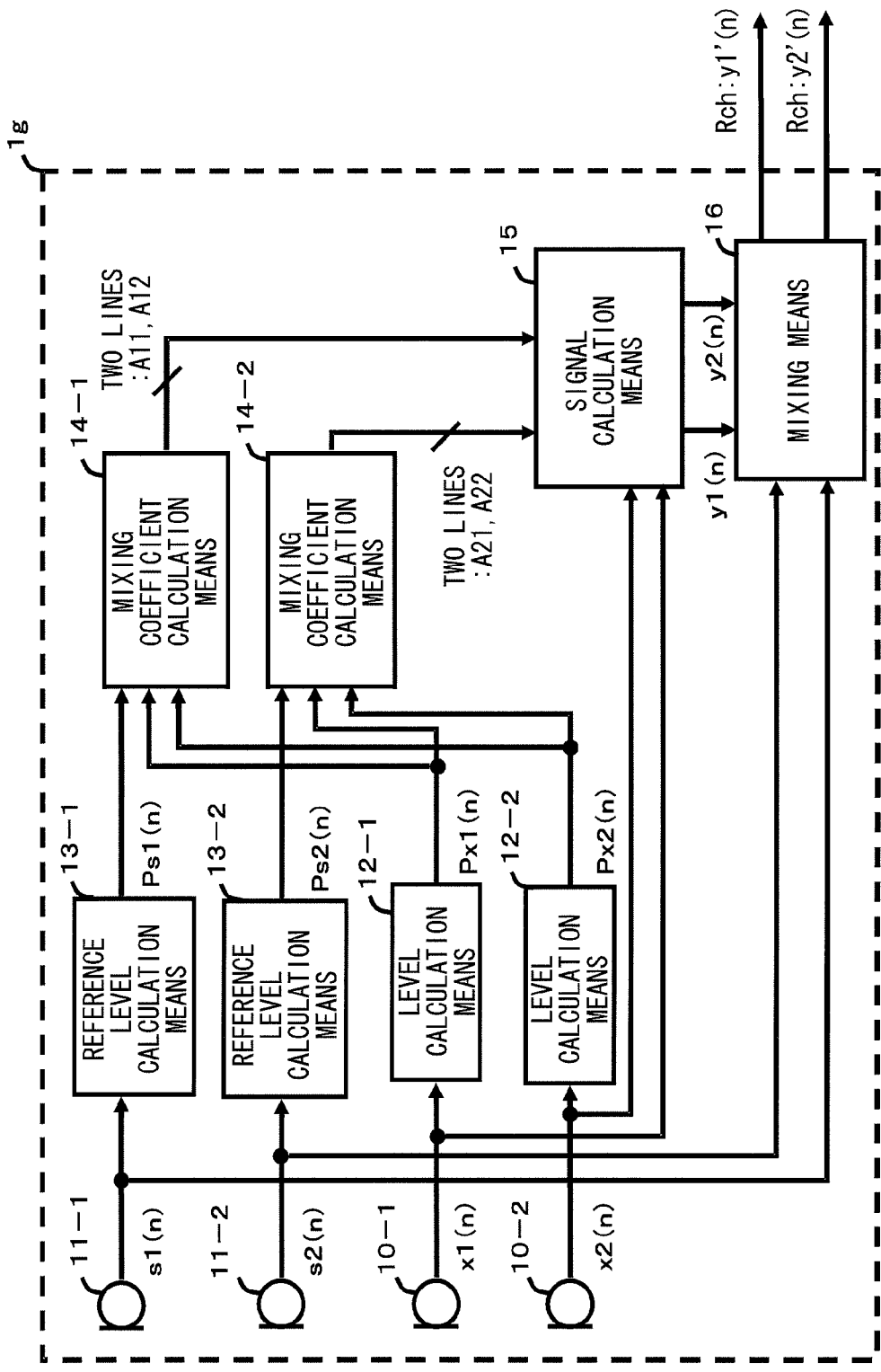
FIG. 13 is a diagram showing a configuration of a sound collecting device 1g according to a seventh embodiment.
Figure 14:
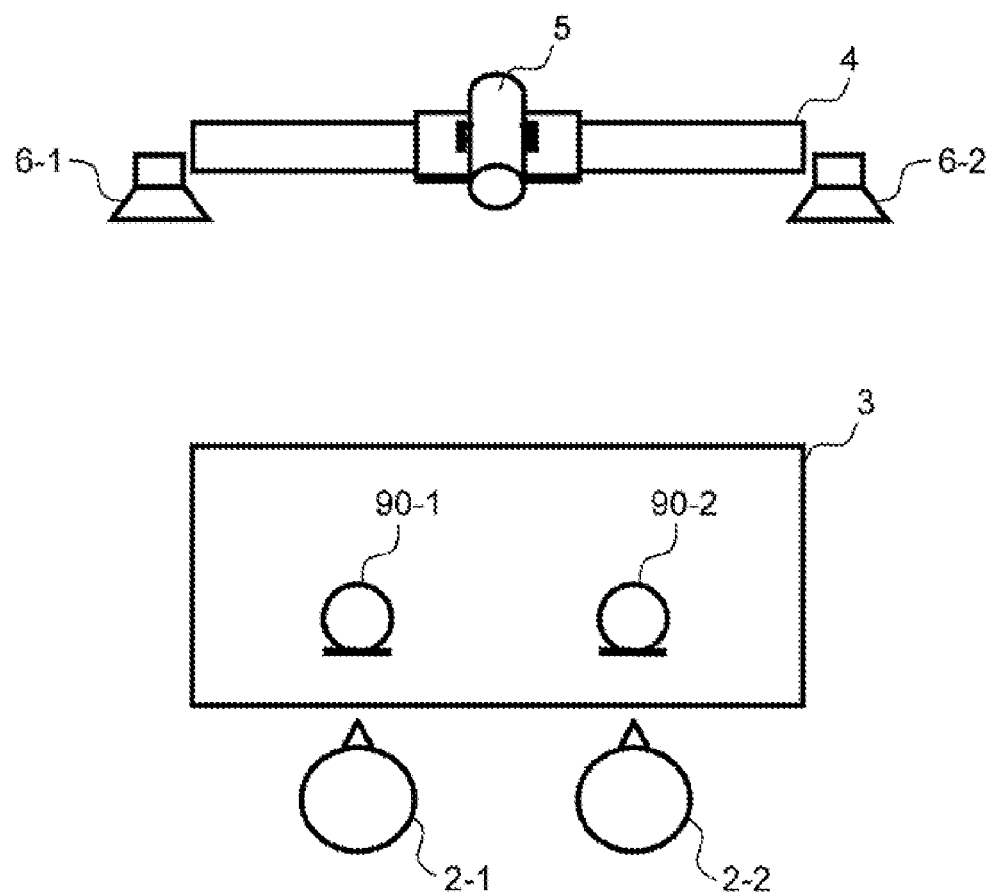
FIG. 14 is a diagram showing a part of a configuration of equipment in a television conference system at a transmission source.
Figure 15:
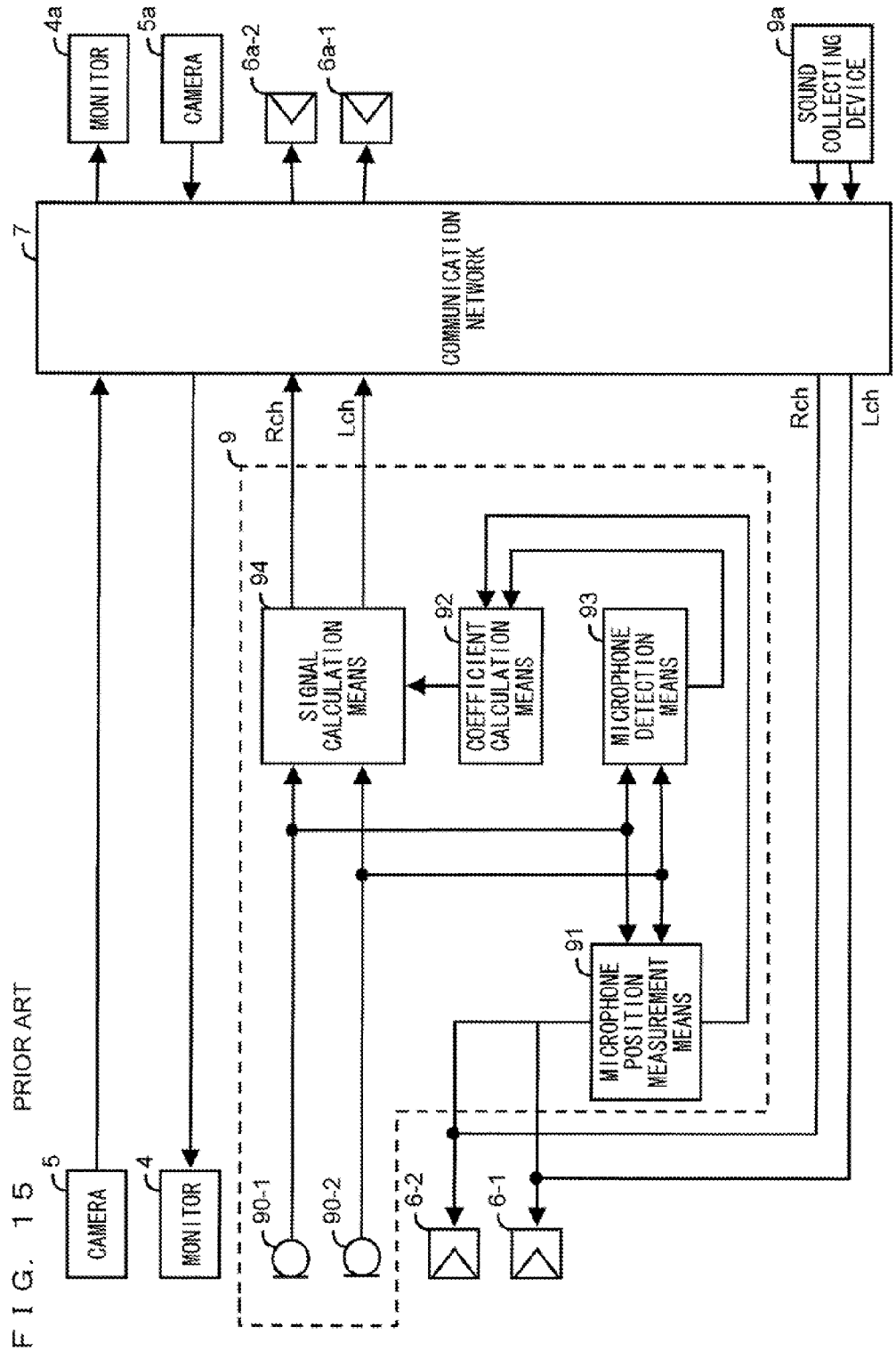
FIG. 15 is a diagram showing in detail a circuitry configuration in the television conference system at the transmission source.

Referring to FIG. 13, a sound collecting device according to a seventh embodiment of the present invention will be described. FIG. 13 is a diagram showing a configuration of a sound collecting device 1g according to the seventh embodiment. The components of the sound collecting device 1g shown in FIG. 13 are provided such that the sound collecting device 1 shown in FIG. 1 and FIG. 2 is replaced by the sound collecting device 1g. In addition, the sound collecting device 1g is different from the sound collecting device 1 shown in FIG. 1 only in that mixing means 16 is newly added to the sound collecting device 1g. Hereinafter, the difference will be mainly described.

The output signals from the reference microphones 11-1 and 11-2 are used only for calculating the coefficients for the actual recording microphones 10-1 and 10-2. However, in the case where there is a difficulty in placement of the actual recording microphones 10-1 and 10-2, and it is impossible to place them near a speaker, or in the case where the actual recording microphones 10-1 and 10-2 are used in an auxiliary manner for collecting a sound produced by a distant speaker, the entirety of an area in which a sound is to be collected cannot be covered by the actual recording microphones. In this case, by mixing the output signals from the reference microphones, the above problem can be reduced.

Specifically, the mixing means 16 adds $s1(n)$ and $s2(n)$ which are outputs of the reference microphones 11-1 and 11-2, to output signals $y1(n)$ and $y2(n)$ of the signal calculation means 15, respectively, so that Lch signals are mixed with each other and Rch signals are mixed with each other, and thereby outputs output signals $y1(n)$ and $y2(n)$.

As described above, in the present embodiment, by mixing the reference microphone signal with the output signal, it becomes possible to collect sounds so as to obtain multichannel signals while keeping sound image localization even when the efficiency of the actual recording microphone collecting sounds is low.

Note that the sound collecting devices described in the above first to seventh embodiments can be realized by an information processing device such as a general computer system. In this case, the sound collecting devices described in the above first to seventh embodiments can be realized by: storing, in a predetermined information storage medium, a sound collection program which causes a computer to execute the above-described processing; and the computer reading out and executing the sound collection program stored in the information storage medium. In addition, examples of the information storage medium for storing the above sound collecting program are a nonvolatile semiconductor memory such as a ROM or a flash memory, a CD-ROM, a DVD, and an optical disc-shaped storage medium similar to them. Alternatively, the above sound collection program may be supplied to the above information processing apparatus through another medium or a communication line.

Note that a part or all of the components of the sound collection devices described in the above first to seventh embodiments may be realized by an integrated circuit such as an LSI, or by using dedicated signal processing circuitry, such that they are included on one chip. In addition, the sound collection apparatuses described in the above first to seventh embodiments may be realized by chips which correspond to the respective functions of the components of the sound collection devices. Note that although an LSI is mentioned above as an example of an integrated circuit, an integrated circuit is also referred to as an IC, a system LSI, a super LSI, or an ultra LSI, depending on the integration degree. In addition, a method of forming an integrated circuit is not limited to LSI, and an integrated circuit may be realized by using a dedicated circuit or a general-purpose processor. An FPGA (Field Programmable Gate Array) which can be programmed after an LSI is manufactured, or a reconfigurable processor which enables a connection or setting of a circuit cell in an LSI to be reconfigured, may be used. Moreover, if a technology, for forming an integrated circuit, which can replace LSI emerges owing to advancement of a semiconductor technology or owing to another technology derived therefrom, it is natural that such a technology may be used for integrating function blocks.

INDUSTRIAL APPLICABILITY

A sound collecting device according to the present invention is capable of even when a microphone which can freely be moved is used, generating multichannel signals realizing sound image localization without performing processing using information about the current position of the microphone. The sound collecting device is used for handsfree apparatuses, broadcast apparatuses such as televisions, television conference systems, conference systems using only sounds, or the like.

The invention claimed is:

1. A sound collecting device used for an acoustic system which outputs signals corresponding to respective channels to a plurality of loudspeakers present at a different place from a place where the sound collecting device is present, via a communication network, the signals including a sound produced by a speaker and collected by using microphones, and which reproduces, by using a plurality of loudspeakers, signals of the respective channels inputted from the different place via the communication network, the sound collecting device comprising:
   a plurality of reference microphones fixedly placed so as to correspond to the respective channels, the plurality of reference microphones collecting an arriving sound produced by the speaker, and outputting reference signals representing signals of the respective channels;
   a plurality of actual recording microphones placed so as to be movable, the plurality of actual recording microphones collecting the arriving sound produced by the speaker, and outputting the collected sound as actual recording signals;
   coefficient calculation means for calculating, for each reference signal, coefficients by which the actual recording signals outputted by the plurality of actual recording microphones are to be multiplied so that the sum of the levels of the actual recording signals coincides with each of the levels of the reference signals outputted by the plurality of reference microphones; and
   signal generation means for generating signals of the respective channels by multiplying each of the actual recording signals outputted by the plurality of actual recording microphones by each of the coefficients calculated for the respective reference signals by the coefficient calculation means.

2. The sound collecting device according to claim 1, further comprising
   mixing means for mixing the reference signals outputted by the plurality of reference microphones with the signals of the respective channels, generated by the signal generation means.

3. The sound collecting device according to claim 1, wherein the plurality of actual recording microphones are placed nearer the speaker than the plurality of reference microphones are.

4. The sound collecting device according to claim 3, further comprising determination means for sequentially determining whether or not the largest one of the levels of the reference signals outputted by the plurality of reference microphones is larger than the largest one of the levels of the actual recording signals outputted by the plurality of actual recording microphones, wherein
   the coefficient calculation means for sequentially calculating the coefficients, and when the determination means determines that the largest one of the levels of the reference signals is larger than the largest one of the levels of the actual recording signals, stopping the calculation of the coefficients, and
   the signal calculation means sequentially calculates the signals of the respective channels, and when the coefficient calculation means stops the calculation of the coefficients, calculates the signals of the respective channels by using coefficients which have been calculated by the coefficient calculation means in the past.

5. The sound collecting device according to claim 3, further comprising determination means for sequentially determining whether or not the sum of the levels of the reference signals outputted by the plurality of reference microphones is larger than the sum of the levels of the actual recording signals outputted by the plurality of actual recording microphones, wherein
   the coefficient calculation means sequentially calculates the coefficients, and when the determination means determines that the sum of the levels of the reference signals is larger than the sum of the levels of the actual recording signals, stops the calculation of the coefficients, and
   the signal calculation means sequentially calculates the signals of the respective channels, and when the coefficient calculation means stops the calculation of the coefficients, calculates the signals of the respective channels by using coefficients which have been calculated by the coefficient calculation means in the past.

6. The sound collecting device according to claim 1, further comprising determination means for sequentially determining whether or not the speaker is producing a sound, based on the levels of the reference signals outputted by the plurality of reference microphones and on the levels of the actual recording signals outputted by the plurality of actual recording microphones, wherein
   the coefficient calculation means sequentially calculates the coefficients, and when the determination means determines that the speaker is not producing a sound, stops the calculation of the coefficients, and
   the signal calculation means sequentially calculates the signals of the respective channels, and when the coefficient calculation means stops the calculation of the coefficients, calculates the signals of the respective channels by using coefficients which have been calculated by the coefficient calculation means in the past.

7. The sound collecting device according to claim 1, further comprising determination means for sequentially determining whether or not a speaker present at the different place is producing a sound, based on the levels of signals of the respective channels, sent from the different place, wherein
   the coefficient calculation means sequentially calculates the coefficients, and when the determination means determines that the speaker present at the different place is producing a sound, stops the calculation of the coefficients, and
   the signal calculation means sequentially calculates the signals of the respective channels, and when the coefficient calculation means stops the calculation of the coefficients, calculates the signals of the respective channels by using coefficients which have been calculated by the coefficient calculation means in the past.

8. The sound collecting device according to claim 1, further comprising:
   a plurality of first level calculation means provided so as to respectively correspond to the plurality of reference microphones, each of the plurality of first level calculation means sequentially calculating the average of the levels of the reference signals outputted, during a time interval, by the corresponding one of the plurality of reference microphones, the time interval depending on a difference between the largest one of distances from the plurality of reference microphones to the speaker, and the smallest one of distances from the plurality of actual recording microphones to the speaker; and a plurality of second level calculation means provided so as to correspond to the plurality of actual recording microphones, each of the plurality of second level calculation means sequentially calculating the average of the levels of the actual recording signals outputted, during the same time interval as in the plurality of first level calculation means, by the corresponding one of the plurality of actual recording microphones, wherein the coefficient calculation means sequentially calculates, for each reference signal, coefficients by which the actual recording signals outputted by the plurality of second level calculation means are to be multiplied so that the sum of the levels of the actual recording signals coincides with each of the levels of the reference signals outputted by the plurality of first level calculation means.

9. The sound collecting device according to claim 1, further comprising:

a plurality of first band extraction means provided so as to respectively correspond to the plurality of reference microphones, each of the plurality of first band extraction means extracting and outputting, among reference signals outputted by the corresponding one of the plurality of reference microphones, a reference signal in a frequency band based on a band of a sound produced by the speaker; and a plurality of second band extraction means provided so as to respectively correspond to the plurality of actual recording microphones, each of the plurality of second band extraction means extracting and outputting, among actual recording signals outputted by the corresponding one of the plurality of actual recording microphones, an actual recording signal in the same frequency band as that used by the first band extraction means, wherein the coefficient calculation means sequentially calculates, for each reference signal, coefficients by which the actual recording signals outputted by the plurality of second band extraction means are to be multiplied so that the sum of the levels of the actual recording signals coincides with each of the levels of the reference signals outputted by the plurality of first band extraction means.

10. The sound collecting device according to claim 1, wherein the plurality of reference microphones and the plurality of actual recording microphones have directionalities, the sound collecting device further comprising:

a plurality of first band extraction means provided so as to respectively correspond to the plurality of reference microphones, each of the plurality of first band extraction means extracting and outputting, among reference signals outputted by the corresponding one of the plurality of reference microphones, a reference signal in a frequency band based on the directionality characteristics of the plurality of reference microphones and the plurality of actual recording microphones; and a plurality of second band extraction means provided so as to respectively correspond to the plurality of actual recording microphones, each of the plurality of second band extraction means extracting and outputting, among actual recording signals outputted by the corresponding one of the plurality of actual recording microphones, an actual recording signal in the same frequency band as that used by the first band extraction means, wherein the coefficient calculation means sequentially calculates, for each reference signal, coefficients by which the actual recording signals outputted by the plurality of second band extraction means are to be multiplied so that the sum of the levels of the actual recording signals coincides with each of the levels of the reference signals outputted by the plurality of first band extraction means.

11. The sound collecting device according to claim 1, further comprising:

a plurality of first steady suppression means provided so as to respectively correspond to the plurality of reference microphones, each of the plurality of first steady suppression means subtracting a steady noise signal from the reference signal outputted by the corresponding one of the plurality of reference microphones, and outputting the resultant signal; and a plurality of second steady suppression means provided so as to respectively correspond to the plurality of actual recording microphones, each of the plurality of second steady suppression means subtracting a steady noise signal from the actual recording signal outputted by the corresponding one of the plurality of actual recording microphones, and outputting the resultant signal, wherein the coefficient calculation means sequentially calculates, for each reference signal, coefficients by which the actual recording signals outputted by the plurality of second steady suppression means are to be multiplied so that the sum of the levels of the actual recording signals coincides with each of the levels of the reference signals outputted by the plurality of first steady suppression means.

12. The sound collecting device according to claim 1, wherein the acoustic system includes a camera for outputting a video image generated by shooting the speaker to a display device present at the different place via the communication network, and the plurality of reference microphones are fixedly provided to the camera.

13. The sound collecting device according to claim 1, wherein the plurality of reference microphones have directionalities, and are placed such that the main axes of the directionalities are directed in directions corresponding to the respective channels.

14. The sound collecting device according to claim 1, wherein the plurality of reference microphones are nondirectional, and are placed at positions different from each other.

15. A sound collecting method performed in an acoustic system which outputs signals corresponding to respective channels to a plurality of loudspeakers present at a different place from a place where the sound collecting device is present, via a communication network, the signals including a sound produced by a speaker and collected by using microphones, and which reproduces, by using a plurality of loudspeakers, signals of the respective channels inputted from the different place via the communication network, the sound collecting method comprising:

a reference step of outputting reference signals by using a plurality of reference microphones fixedly placed so as to correspond to the respective channels, the plurality of reference microphones collecting an arriving sound produced by the speaker, and outputting the reference signals representing signals of the respective channels;

an actual recording step of outputting actual recording signals by using a plurality of actual recording microphones placed so as to be movable, the plurality of actual recording microphones collecting the arriving sound produced by the speaker, and outputting the collected sound as the actual recording signals;

a coefficient calculation step of calculating, for each reference signal, coefficients by which the actual recording signals outputted by the plurality of actual recording microphones are to be multiplied so that the sum of the levels of the actual recording signals coincides with each of the levels of the reference signals outputted by the plurality of reference microphones; and a signal generation step of generating signals of the respective channels by multiplying each of the actual recording signals outputted by the plurality of actual recording microphones in the actual recording step by each of the coefficients calculated for the respective reference signals in the coefficient calculation step.

16. A storage medium having stored therein a sound collecting program to be executed by a computer used in an acoustic system which outputs signals corresponding to respective channels to a plurality of loudspeakers present at a different place from a place where the sound collecting device is present, via a communication network, the signals including a sound produced by a speaker and collected by using microphones, and which reproduces, by using a plurality of loudspeakers, signals of the respective channels inputted from the different place via the communication network, the sound collecting program causing the computer to execute:

a reference step of outputting reference signals by using a plurality of reference microphones fixedly placed so as to correspond to the respective channels, the plurality of reference microphones collecting an arriving sound produced by the speaker, and outputting the reference signals representing signals of the respective channels;

an actual recording step of outputting actual recording signals by using a plurality of actual recording microphones placed so as to be movable, the plurality of actual recording microphones collecting the arriving sound produced by the speaker, and outputting the collected sound as the actual recording signals;

a coefficient calculation step of calculating, for each reference signal, coefficients by which the actual recording signals outputted by the plurality of actual recording microphones are to be multiplied so that the sum of the levels of the actual recording signals coincides with each of the levels of the reference signals outputted by the plurality of reference microphones; and a signal generation step of generating signals of the respective channels by multiplying each of the actual recording signals outputted by the plurality of actual recording microphones in the actual recording step by each of the coefficients calculated for the respective reference signals in the coefficient calculation step.

17. An integrated circuit used for an acoustic system which outputs signals corresponding to respective channels to a plurality of loudspeakers present at a different place from a place where the sound collecting device is present, via a communication network, the signals including a sound produced by a speaker and collected by using microphones, and which reproduces, by using a plurality of loudspeakers, signals of the respective channels inputted from the different place via the communication network, the acoustic system comprising:

a plurality of reference microphones fixedly placed so as to correspond to the respective channels, the plurality of reference microphones collecting an arriving sound produced by the speaker, and outputting reference signals representing signals of the respective channels; and a plurality of actual recording microphones placed so as to be movable, the plurality of actual recording microphones collecting the arriving sound produced by the speaker, and outputting the collected sound as an actual recording signals, and the integrated circuit comprising:

coefficient calculation means for calculating, for each reference signal, coefficients by which the actual recording signals outputted by the plurality of actual recording microphones are to be multiplied so that the sum of the levels of the actual recording signals coincides with each of the levels of the reference signals outputted by the plurality of reference microphones; and signal generation means for generating signals of the respective channels by multiplying each of the actual recording signals outputted by the plurality of actual recording microphones by each of the coefficients calculated for the respective reference signals by the coefficient calculation means.

\* \* \* \* \*

UNITED STATES PATENT AND TRADEMARK OFFICE
CERTIFICATE OF CORRECTION

PATENT NO. : 8,249,269 B2
APPLICATION NO. : 12/746624
DATED : August 21, 2012
INVENTOR(S) : Shin-ichi Yuzuriha It is certified that error appears in the above-identified patent and that said Letters Patent is hereby corrected as shown below:

On the Title Page

In item (54), and in column 1, lines 1-3, "SOUND COLLECTING DEVICE, SOUND COLLECTING METHOD, AND COLLECTING PROGRAM, AND INTEGRATED CIRCUIT" should read --SOUND COLLECTING DEVICE, SOUND COLLECTING METHOD, SOUND COLLECTING PROGRAM, AND INTEGRATED CIRCUIT--.

Signed and Sealed this
Fifteenth Day of January, 2013

David J. Kappos
*Director of the United States Patent and Trademark Office*